(12) United States Patent
Savell

(10) Patent No.: US 6,819,732 B1
(45) Date of Patent: Nov. 16, 2004

(54) ASYNCHRONOUS SAMPLE RATE ESTIMATION USING RECIPROCAL FREQUENCY ERROR MINIMIZATION

(75) Inventor: Thomas C. Savell, Santa Cruz, CA (US)

(73) Assignee: Creative Technology Ltd., Singapore (SG)

( * ) Notice: Subject to any disclaimer, the term of this patent is extended or adjusted under 35 U.S.C. 154(b) by 845 days.

(21) Appl. No.: 09/644,141

(22) Filed: Aug. 22, 2000

(51) Int. Cl.[7] ................................................ H04L 7/00
(52) U.S. Cl. ........................ 375/377; 375/371; 375/372
(58) Field of Search ................................ 375/371, 372, 375/377, 370, 362; 370/516, 545, 465, 468; 710/52, 53, 57, 58, 60, 61

(56) References Cited

U.S. PATENT DOCUMENTS

| | | | | |
|---|---|---|---|---|
| 4,181,975 A | * | 1/1980 | Jenkins | 370/517 |
| 5,195,088 A | * | 3/1993 | Urbansky | 370/545 |
| 5,283,787 A | * | 2/1994 | Fletcher et al. | 370/517 |
| 5,327,430 A | * | 7/1994 | Urbansky | 370/465 |
| 5,537,477 A | * | 7/1996 | Gauthier et al. | 381/314 |
| 5,604,773 A | * | 2/1997 | Urala | 375/372 |
| 5,666,299 A | | 9/1997 | Adams et al. | |
| 5,875,354 A | * | 2/1999 | Charlton et al. | 710/61 |
| 6,092,126 A | | 7/2000 | Rossum | |
| 6,252,919 B1 | * | 6/2001 | Lin | 375/377 |

OTHER PUBLICATIONS

R. Adams and T. Kwan, "A Stereo Asynchronous Digital Sample–Rate Converter for Digital Audio", Solid–State Circuits, IEEE Journal of, vol. 29, Issue: 4, Apr. 1994, pp. 481–488.*

Y. Medan and U. Shvadron, "Asynchronous Rate Conversion", Multimedia Signal Processing, 1997, IEEE First Workshop on, Jun. 23–25, 1997, pp. 107–112.*

D. Wenzel and J. Speidel, "A digital Asynchronous Sample–Rate Converter for Digital Video Signals", Consumer Electronics, IEEE Transactions on, vol.: 46, Issue: 1, Feb. 20. pp. 207–214.*

U.S. patent application Ser. No. 09/084,154, Savell et al., filed May 20, 1998.

* cited by examiner

Primary Examiner—Tesfaldet Bocure
Assistant Examiner—Khanh Cong Tran
(74) Attorney, Agent, or Firm—Blakely, Sokoloff, Taylor & Zafman LLP

(57) ABSTRACT

An asynchronous sample rate estimator and a method for generating a rate estimate to track an asynchronous input sampled signal is disclosed. The present invention achieves lock quickly and maintains an optimum input buffer configuration and enhanced signal fidelity by responding quickly and accurately to changes in the incoming frequency. An asynchronous sample rate estimator receives and determines a measured sample period of an asynchronous input signal. Furthermore, a reciprocal frequency error signal and a current rate estimate signal are used to generate a rate estimate for tracking the read pointer to the write pointer of a FIFO buffer, as well as a phase correction signal for centering the write pointer in the FIFO buffer. An asynchronous sample rate estimator might also include an error gain generator for providing an error gain and a lock detector for indicating whether the system has achieved a locked condition.

44 Claims, 9 Drawing Sheets

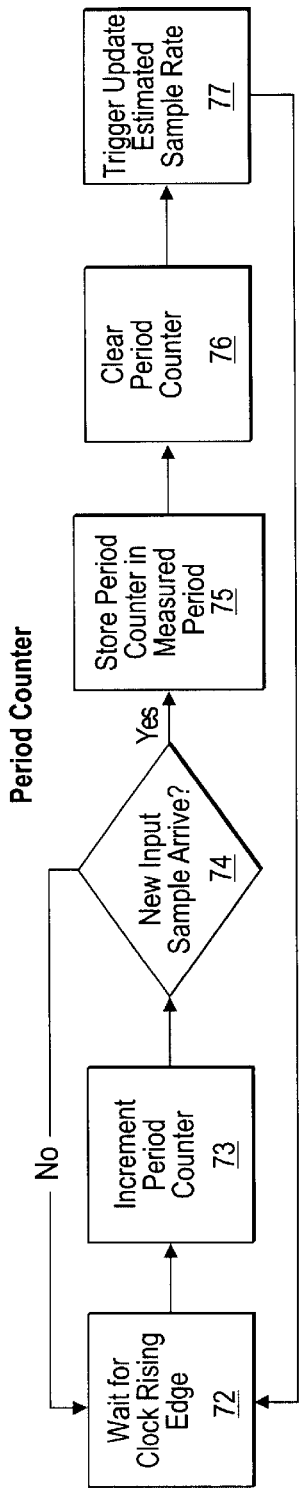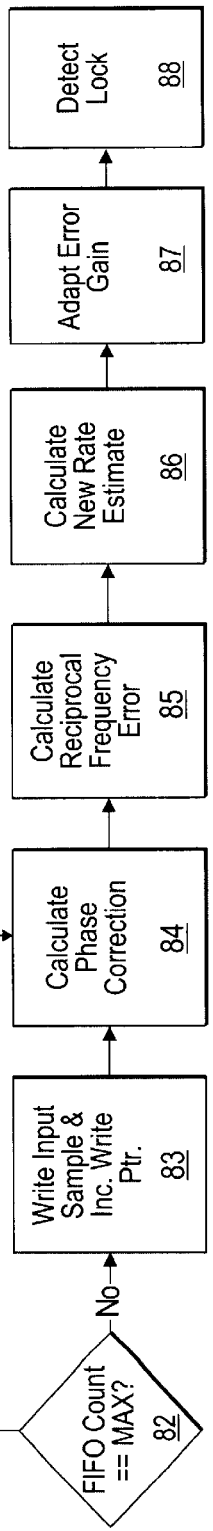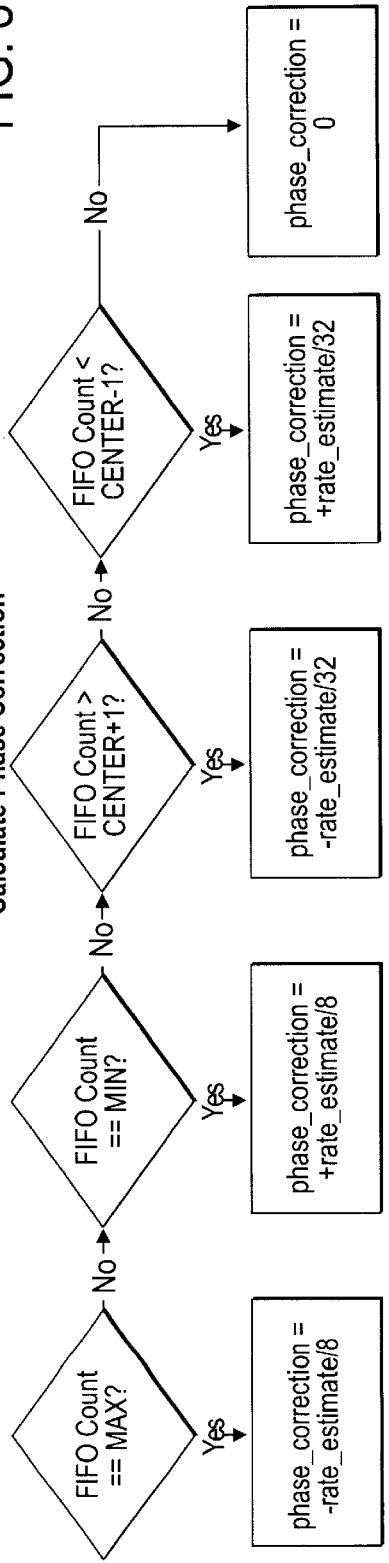

US 6,819,732 B1

ASYNCHRONOUS SAMPLE RATE ESTIMATION USING RECIPROCAL FREQUENCY ERROR MINIMIZATION

COPYRIGHT NOTICE

A portion of the disclosure recited in the specification contains material which is subject to copyright protection. Specifically, an Appendix in accordance with 37 CFR Section 1.96 is included which lists less than 10 pages of source code instructions for a process by which the present invention is practiced in a computer system. Appendix A comprises five pages. The copyright owner has no objection to the facsimile reproduction of the specification as filed in the Patent and Trademark Office. Otherwise, all copyright rights are reserved.

BACKGROUND OF THE INVENTION

This invention generally relates to an apparatus and a method for estimating a frequency of an asynchronous signal being received at an input sample rate. More specifically, this invention relates to estimating, or tracking, an input sample frequency, and further provides a rate estimate of the input sample frequency for use in audio applications.

Many audio devices, such as computer sound cards and recording studio equipment, operate to receive, transmit, and manipulate audio information in a digital, rather than analog, form. Some audio sources, such as compact-disk players, Z-Video players, and digital video disks, generate a digital signal directly. Other audio sources, such as microphones, generate an analog signal, which can be converted to a digital signal with an analog-to-digital converter ("ADC"). An ADC typically "samples" the analog signal at a rate high enough to preserve the acoustic characteristics of the analog audio signal. Regardless whether the data is from a digital signal source or from an analog signal source (converted by an ADC), the data rate of the source may be different from the rate at which a digital audio device manipulates data. Digital audio devices that can receive digital data streams from a variety of sources at a variety of data rates often include digital sample rate converters that convert the input sample rate to an output sample rate that is compatible with the digital audio device.

Sample rate converters, whether digital, analog, or a combination thereof, may be considered either synchronous or asynchronous. A synchronous sample rate converter shares a common time base, or clock, with the input signal source. In order for a synchronous sample rate converter to operate, it must be able to lock to the clock signal used by the input device, and the input device must provide a clock output or a third device must provide a common clock output. An asynchronous sample rate converter does not require a common time base with the input signal source, and can accept input data from a wide variety of sources. Such asynchronous sample rate converters generally comprise a means (e.g., sample rate estimator) in which to first estimate the input sample rate or frequency of the stream of input data before frequency conversion proceeds. In operation, an asynchronous digital sample rate converter, for example, can convert between any two sample rates within the operating range of the converter, wherein the input sample rate is determined by a sample rate estimator.

One type of asynchronous digital sample rate converter takes an input sample stream, converts it to an analog signal with a digital-to-analog converter (DAC), and then converts that analog signal back to a digital signal at the desired output sample rate with an ADC. This approach is simple to understand and is direct, but is complex to implement and produces an inferior signal because of the distortion and noise that the A-to-D and D-to-A conversions add.

An alternative to asynchronous digital sample rate conversion is to use a phase-locked-loop approach. The phase-locked loop approach adapts the output data rate to the input data rate by adjusting the internal clock rate of the receiving device to the clock rate of the input device. The clock rate of the input device and the internal clock rate are both provided to a mixer, the mixer output, or product, is zero when the two rates are the same, and when the two clock rates are not the same, the mixer output is converted into a signal that adjusts the internal clock rate. This process can take several seconds to achieve lock and limits input data to those signals with a clock rate within the tuning range of the internal clock. The time-to-lock can be especially undesirable if the input clock rate is not constant, but drifts or otherwise changes. Another disadvantage of this approach is that, while the two clock rates are frequency matched, no phase relationship between the input and output data is maintained, which could lead to a loss of input data if the input data overwrites valid data. This also precludes the use of more than one asynchronous stream at a time, or mixing of a fixed-rate internal signal with the external asynchronous signal.

Many sample rate converters, including their constituent sample rate estimators, temporarily store the input data in a random-access memory ("RAM"), or other type of memory, to buffer the data while the sample rate estimation and conversion process proceeds. The RAM has a finite capacity and can not store an endless stream of input data; therefore, once an input value is read from a RAM address, that address becomes available for another input data point. FIG. 1 shows a simplified representation of a buffer 10 that is configured as a circle for illustrative purposes. Each segment 3 of the buffer represents an address where a data point may be written to or read from. The next input data point will be read into the buffer at the input data pointer location 5, writing over the value stored in that location, which has already been read. The next output data point will be read from the buffer at the output data pointer location 7. Both pointers will increment in the same direction around the buffer, represented by arrows, according to the input sample rate 9 and the output sample rate 11. The distance between the input pointer 5 and the output pointer 7 is represented as a phase angle 8. If the input sample rate suddenly increases, the input data pointer might overrun the output data pointer, writing over data that has not yet been read. In a phase-locked system that does not account for the phase relationship between the input data sample rate and the output data sample rate, small excursions in the input data sample rate might cause the input data pointer to overrun valid data in the buffer.

Therefore an asynchronous sample rate converter which achieves lock quickly and maintains an optimum input buffer configuration and signal fidelity is needed, wherein an apparatus and a method of estimating an actual input sample rate responds very fast to changes in the incoming frequency and can be made extremely accurate.

SUMMARY OF THE INVENTION

The present invention provides an apparatus and a method for estimating the sample rate of an asynchronous input, the apparatus and method for use in a digital device, such as a computing system, which responds very fast to changes in the incoming frequency and is extremely accurate.

Accordingly, in one embodiment, the present invention provides an asynchronous sample rate estimating apparatus having an internal data rate, wherein the apparatus comprises an input stage to receive a plurality of input data samples in a periodic data stream, the input stage configured to provide the plurality of input data samples and configured further to generate a phase error signal based upon later input data samples, a phase corrector configured to receive the phase error signal and a rate estimate signal to produce a phase correction signal, a reciprocal frequency error generator configured to receive a measured period and a current rate estimate to provide a reciprocal frequency error signal having a reciprocal frequency error signal amplitude, and a summing unit configured to receive the reciprocal frequency error signal and the phase correction signal and configured to provide a rate estimate correction signal, wherein the rate estimate correction signal is used to generate the new frequency estimate of the periodic data stream of input samples.

In another embodiment, the present invention provides an asynchronous sample rate estimating apparatus comprising a first-in-first-out buffer configured to receive input data at an input data rate, a write pointer configured to indicate a next data input position in the buffer, the write pointer configured to move to the next data input position at the input data rate, a read pointer configured to indicate a next data output position in the buffer, the read pointer configured to move to the next data output position according to a current rate estimate signal, a phase detector configured to provide a phase error signal, a reciprocal frequency error generator configured to receive a current rate estimate and a measured period to provide a reciprocal frequency error signal, a rate estimator configured to receive the reciprocal frequency error signal and a phase correction signal to provide a rate estimate signal, and a phase corrector configured to receive the phase error signal and the rate estimate signal to produce the phase correction signal, wherein the rate estimate signal is used to determine a frequency estimate of the input data rate.

In yet another embodiment, the present invention provides a method for estimating the frequency of an asynchronous signal comprising the steps of receiving a sampled asynchronous signal input, determining a measured sample period by evaluating a plurality of clock cycles between the sampled asynchronous signal input and a previously sampled asynchronous signal input, updating a reciprocal frequency error signal based upon a current rate estimate, generating a new phase correction signal based upon a rate estimate for centering a write pointer in a FIFO containing the sampled asynchronous signal input, and generating a rate estimate correction signal from the reciprocal frequency error signal and a current phase correction signal, where the current phase correction signal is based upon the new phase correction signal. In yet still another embodiment, the method further comprises the steps of adapting a current error gain to provide an error gain, and scaling the rate estimate correction signal to generate a new rate estimate step size, wherein the new rate estimate step size is used to approximate an estimated frequency to an actual frequency. Another embodiment of the present invention provides a method further comprising the steps of monitoring a system lock detector, and looping through the previous steps until a system lock is detected thus indicating the rate estimate is equivalent to the actual frequency.

BRIEF DESCRIPTION OF THE DRAWINGS

FIG. 7 is a simplified flowchart illustrating a specific embodiment of the process for determining a measured period signal;

FIG. 8 is a simplified flowchart illustrating a specific embodiment of a method in which the exemplary asynchronous sample rate estimator operates to adapt an error gain signal to calculate a new rate estimate;

FIG. 9 is a simplified flowchart showing a specific embodiment of a method for calculating a phase correction factor;

DESCRIPTION OF THE SPECIFIC EMBODIMENTS

The following detailed description of specific embodiments, including preferred embodiments, reference the accompanying drawings that form part of this disclosure. The drawings illustrate examples of the embodiments and how to practice the invention. Without departing from the scope of the present invention, other embodiments may be used in place of those shown and described, and such substitutions should be apparent to one of ordinary skilled in the art. For example, the various elements disclosed according to the present invention might be embodied in varying degrees of hardware and software implementation, as one skilled in the art would appreciate upon reading this disclosure.

In a specific embodiment, an asynchronous sample rate estimator is used, for example, in a digital audio processor operating as an asynchronous sample rate converter, or is used in other devices which convert a first digital data stream to another digital data stream, where the two data streams do not share a common time base, such as data modems, digital signal analyzers, video processors, receivers, and other electronic devices.

An asynchronous sample rate converter according to an embodiment of the present invention quickly achieves a stable lock to the rate at which sampled asynchronous inputs are received by scaling a reciprocal frequency error signal to the output sample rate according to, among other things, the detected difference between input and output sample rates. Such scaling is performed by an exemplary sample rate estimator described later in more detail. In another embodiment, a quick and stable lock is obtained even when the input and output sample rates are identical. The converter also minimizes the potential for losing data due to excursions in the input sample rate by maintaining a phase relationship between the input data and the output data.

Figure 1:
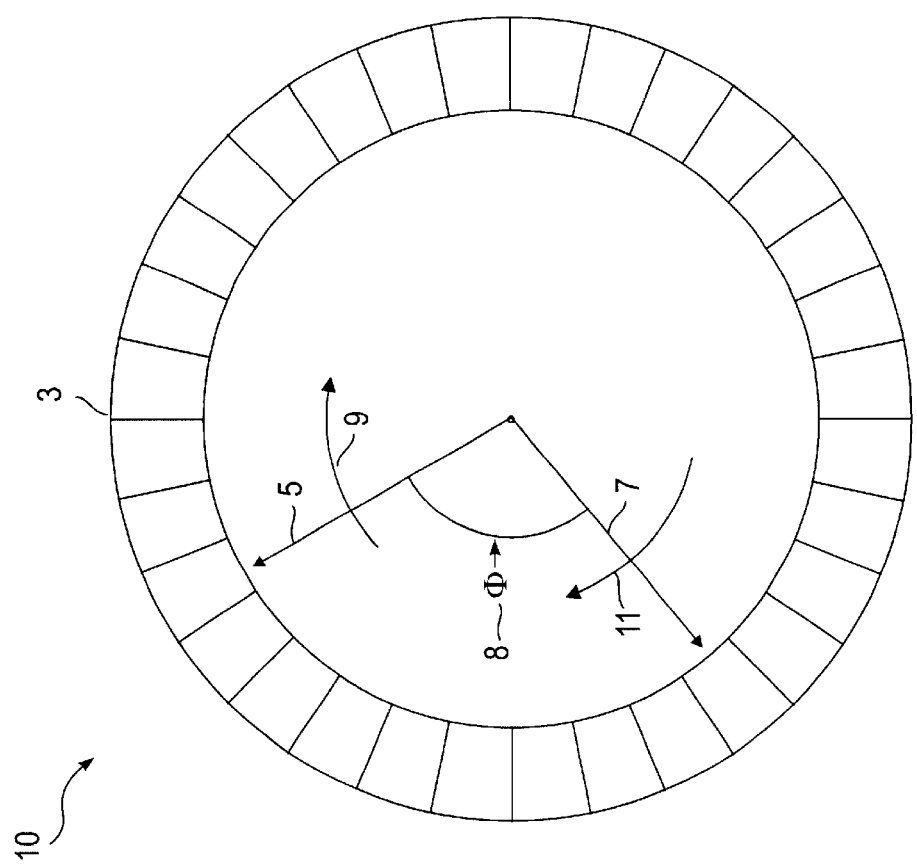
FIG. 1 is a simplified representation of a buffer showing the relationship between a read pointer and a write pointer.
Figure 2:
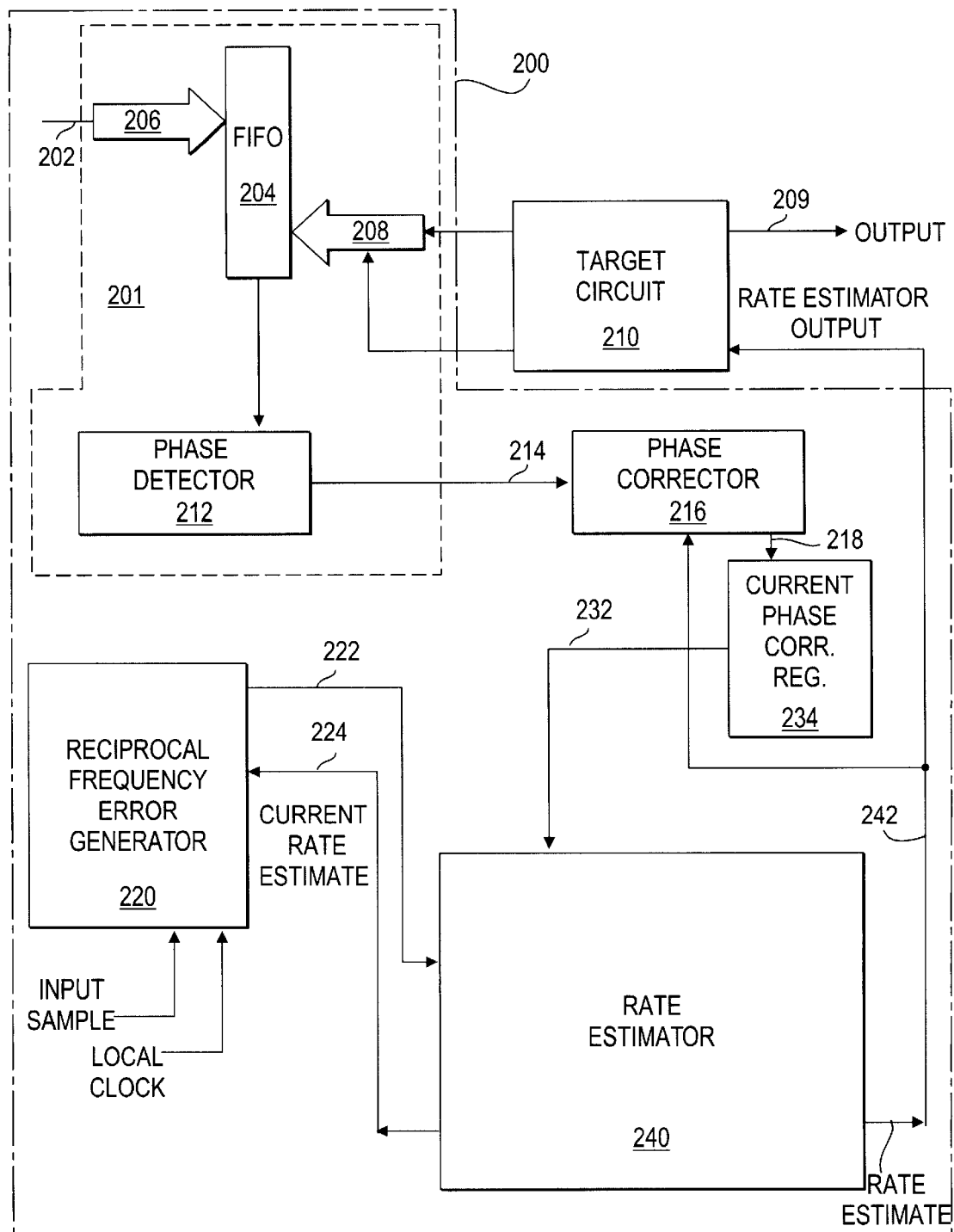
FIG. 2 is a simplified block diagram of a sample rate converter, including a sample rate estimator, according to an embodiment of the present invention.

An exemplary asynchronous sample rate estimator 200 is shown in FIG. 2. In one specific embodiment according to the present invention, asynchronous sample rate estimator 200 includes input stage 201, phase corrector 216, reciprocal frequency error generator 220, rate estimator 240, and other elements as shown, such as target circuit 210 and current phase register 234. Input stage 201 operates to receive incoming data to be sampled and to provide phase error signal to the phase corrector to maintain a phase relationship between the input data and the output data. Internal to input stage 201 is a memory for storing a plurality of input data received into the input stage. Furthermore, input stage 201 includes a mechanism to transmit the stored input data from the input stage to target circuit 210 for further data processing.

In another specific embodiment of the present invention, asynchronous sample rate estimator 200 includes buffer 204, phase detector 212, phase corrector 216, reciprocal frequency error generator 220, rate estimator 240, and other elements as shown, such as target circuit 210 and current phase register 234. Buffer 204 is adapted to receive an input data stream containing, for example, digitized video or audio information, from an external source (not shown), such as a digital video or audio disk. Buffer 204 is configured further to provide write and read pointer location information to phase detector 212. In turn, phase detector 212 is configured to provide phase error signal 214 to phase corrector 216. A signal described herein refers to signals having one or more states, for example, the state of enabling or disabling a function. Alternatively, a signal may have an amplitude, or a magnitude, associated with it for further digital signal processing.

Buffer 204 operates to receive and to provide input data 202 from a source (not shown), such as a compact disc containing digital audio, which is streamed into buffer 204 via write pointer 206. Write pointer 206 determines the location of the buffer address (not shown) that will receive a data point (not shown). The write pointer moves to a new buffer address on each input cycle, hence the "write rate." Buffer 204 is, for example, a 16-point first-in-first-out (FIFO) buffer. The location of the next sampled input data point is indicated by an advancing write pointer 206 wherein the advancement of write pointer 206 is determined by the source data rate. Read pointer 208 indicates the location of the next output data point that will be introduced into application-specific circuitry, such as target circuit 210, and also moves to a new buffer address on each read cycle. To minimize the possibility of overwriting valid data before it can be read due to an excursion in the input sample rate, it is desirable to keep the write pointer and the read pointer as far apart as possible. In other words, it is desirable to keep the distance between the write pointer and the read pointer, as measured in data point locations in the FIFO buffer, equal to half the buffer size (e.g., 8 point locations of a 16-point FIFO) where a point is a digitized sample of an asynchronous analog signal to be sampled. Buffer 204 also is configured to provide phase detector 212 with information to calculate the separation between the address locations of the two pointers. This separation is the phase error between the write rate and the read rate and is also described herein as the "FIFO count," (i.e., FIFO CNT). In one aspect of the invention, the FIFO count is a numeric value which represents the number of valid samples in the FIFO buffer. In operation, it is desirable that the read rate equal the write rate and that the read and write pointers are separated by one half the buffer size.

FIFO buffer 204, for example, has 16 addresses and if the write pointer is at FIFO address 10, while the read pointer is at FIFO address 4, the difference between the pointers is +6 and thus results in a FIFO count of 6. If the difference is negative, however, the difference is first added to the BUFFER SIZE before performing a modulo operation. Then, the FIFO count is determined by the following: (write pointer−read pointer) modulo (BUFFER SIZE). For example, if the write pointer is at FIFO address 4 while the read pointer is at FIFO address 10, the difference between the pointers is −6. With a buffer size of 16, the modulo result is 10 (i.e., −6+16). Thus, the FIFO count is −6 modulo 16, or +10. Accordingly, FIFO count herein is referenced as a non-negative number.

One skilled in the art should understand that the "difference between the pointers" refers to the number of addresses that the read pointer would have to advance in order to overtake the write pointer, and not simply the absolute value of one buffer address subtracted from another. The latter does not necessarily provide the correct polarity or magnitude of the FIFO count when the write pointer passes through the initial buffer address (i.e., when the write pointer has a lower address value than the read pointer). The optimal phase error is zero, which occurs when the write pointer is separated from the read pointer by one half the buffer. In one embodiment, the sample rate estimator momentarily changes the output sample (read) rate to provide a FIFO count of zero so that the maximum phase difference between the write pointer and the read pointer is maintained at, for example, 180° out of phase.

In a sample rate converter application, for example, if the input sample rate is 44.1 kHz, and the output rate is 48 kHz, the nominal rate at which data is read from the buffer is 44.1 kHz. Otherwise, the write pointer and read pointers would not maintain a half buffer distance between them. Thus, the read rate "tracks" the input sample rate, or the write rate. Target circuit 210, if configured to operate as a convolver, interpolates additional data points to provide an output data stream at the internal clock rate of 48 kHz, as is known in the art. If the read rate was consistently greater than the write rate, the read pointer would periodically overtake the write pointer (like the minute hand overtaking the hour hand on a clock) and read stale data (data that has already been read and is no longer valid) from the buffer. If the read rate was consistently less than the write rate, the write pointer would periodically overtake the read pointer and overwrite valid data before that data could be read.

Referring again to FIG. 2, phase detector 212 receives write pointer 206 and read pointer 208 address locations from buffer 204 and determines the phase error, or FIFO count, which is, for example, the difference between the write pointer location and the read pointer location modulo buffer size. The output of phase detector 212 is expressed as phase error signal 214 and is provided to phase corrector 216.

Phase corrector 216 operates to maintain a particular phase relationship (buffer address differential) between the write pointer and the read pointer by applying a phase correction factor to the rate estimate, wherein the rate estimate directly or indirectly influences the read rate. As discussed above, it is desirable to maintain nominally 180 degrees of phase difference, or one half the buffer size, between the write pointer and the read pointer to minimize the chance that excursions in the input sample rate cause valid data to be overwritten, or stale data to be read.

The phase correction factor can be described as a bump or a kick to the new estimated read rate generated by rate estimator 240, described herein. The phase correction factor is applied to the rate estimate only if the phase error is outside of a selected window to avoid audible distortions in the read data at or near lock. The phase correction factor is increased as the phase error increases, so as to force or to coerce the phase difference to the desired value more quickly. Phase corrector 216 is described in more detail later.

Exemplary asynchronous sample rate estimator 200 also includes reciprocal frequency error generator 220 configured to provide reciprocal frequency error signal 222 to rate estimator 240 and configured further to receive current rate estimate 224 from rate estimator 240. Reciprocal frequency error signal 222 is generated to help rate estimator 240 produce a new rate estimate such that as the frequency estimate approaches the true rate, the reciprocal frequency error signal will approach zero. Reciprocal frequency error signal 222 is derived from the reciprocal relationship between frequency and period as shown in Equation 1.

$$\text{frequency} = \frac{1}{\text{period}} \qquad \text{Equation 1}$$

Equation 1 can be expressed algebraically as shown in Equation 2.

$$(\text{frequency} \cdot \text{period}) - 1 = 0 \qquad \text{Equation 2}$$

This relationship also applies to an estimate of the input data frequency. If the estimate is correct, the relationship holds. This means that an error signal can be derived from this equation, as follows:

$$\epsilon_{recip} = (\text{frequency\_estimate}_1 \cdot \text{period}_{measured}) - 1 \qquad \text{Equation 3}$$

As shown in Equation 3, once the frequency estimate converges on the actual frequency, the reciprocal frequency error signal will be zero. The reciprocal frequency error signal 222 is linearly proportional to the ratio between the frequency estimate and the actual frequency. This is true with a continuous time model, where infinite precision is available for both the period measurement and the frequency estimate.

Realizable systems, however require quantized time measurement for the period. Therefore, a scaling term "α" is employed to filter out jitter in the period measurement as illustrated in Equation 4. The scaling term α is adapted over time to cause the error signal to approach zero as the rate estimate converges upon the actual frequency.

$$\epsilon_{recip} = \alpha \cdot [(\text{frequency\_estimate}_1 \cdot \text{period}_{measured}) - 1] \qquad \text{Equation 4}$$

Figure 3:
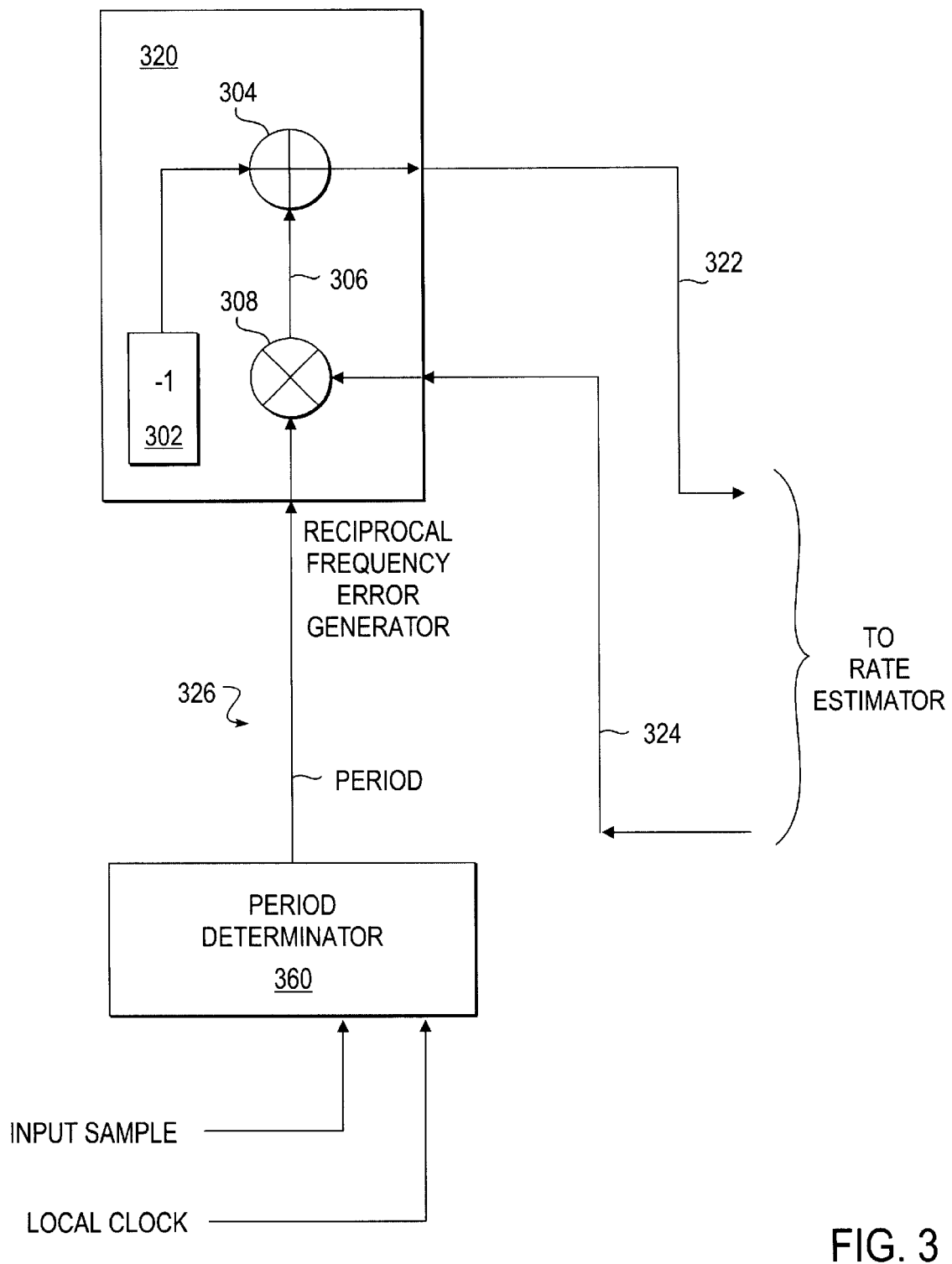
FIG. 3 is a simplified block diagram of a reciprocal frequency error generator according to an embodiment of the present invention.

Reciprocal frequency error generator 220 is configured to generate reciprocal frequency error signal 222 as illustrated in FIG. 3.

In FIG. 3, one embodiment is shown where reciprocal frequency error generator 320 is adapted to receive measured period 326 from period determinator 360. Measured period 326 is an estimate of the period of the asynchronous digital data stream which is sampled at the input of asynchronous sample rate estimator 200 of FIG. 2. In another embodiment, reciprocal frequency error generator 320 is adapted to receive current rate estimate 324 from rate estimator 240 of FIG. 2.

Reciprocal frequency error generator 320 includes multiplying unit 308 for multiplying measured period 326 and current rate estimate 324 to obtain the resulting product referred in this application as biased reciprocal product 306. Multiplying unit 308 is adapted to provide biased reciprocal product 306 to summing unit 304. Summing unit 304 is configured to receive from one-generator 302 a negative value of one for removing the bias from biased reciprocal product 306, thus centering the reciprocal product around zero. The resulting sum of biased reciprocal product 306 and a negative value of one yields reciprocal frequency error signal 322, which is unbiased.

Reciprocal frequency error generator 320 receives an estimated period of the input sample data, which according to one embodiment of the present invention, is from period determinator 360. Period determinator 360 determines the approximate source sample period (i.e., measure period) based upon the input samples and the local system clock. For example, period determinator 360 may count the number of local clock edges between two sequential source samples to determine the approximate length of the most recent period. For example, a counter is implemented to count the number of local clock edges during period approximation. As period determinator 360 receives additional source samples, the counter is reset and period determinator 360 will generate another value of the approximated period.

The flowchart in FIG. 7 illustrates a specific embodiment of the process in which period determinator 360 determines measured period signal 326 of FIG. 3. In step 72, the period determinator monitors and waits for the clock rising edge and increments a period counter in step 73 for each clock edge, until a new input sample arrives and is detected in step 74. The number of clock edges stored in period counter are then loaded into measured period buffer in step 75, thus making the measured period available for generating measured period signal 326. The period counter is reset in step 76 and then the rate estimate is updated in step 77.

Referring back to FIG. 2, rate estimator 240 is configured to receive reciprocal frequency error signal 322 of FIG. 3, for generating rate estimate 242. The rate estimate is used to track and to lock the read rate to the write rate. Rate estimator 240 also receives a current phase correction signal from current phase correction register 234 for providing the rate estimate 242 to phase corrector 216. In turn, the phase corrector generates a new phase correction signal.

As discussed above, in an asynchronous system, the signal source that is providing the input data stream does not share a common time base with the digital device that is receiving the data stream. Therefore, the digital device must determine the input sample rate from the input data stream in order to track the input data. This is done, for example, by evaluating the difference between the location of the read pointer and the write pointer.

Ideally, the read rate is identical to the write rate, and the read pointer is 180 degrees out of phase from the write pointer. However, the write rate may drift or jitter. In operation of an exemplary asynchronous sample rate estimator, if the read rate is too fast or too slow, then there is, or was, an error in the read rate, and the read rate must be corrected in order to maintain tracking at the proper phase relationship to the write rate. At least two types of corrections to the read rate may be appropriate.

The first type of correction is made to match the read rate to the write rate, to account for a drift in the write rate, for example. The other type of correction is an adjustment that moves, or "kicks," the read pointer to the correct location in the buffer to maintain 180 degrees of phase difference from the write pointer, to account for jitter in the write rate, for example. This phase correction can be either momentary, where it does not affect future values of the rate estimate, or it may be incorporated directly into the rate estimate. It is possible to provide both types of corrections simultaneously; however, it is desirable that any correction occur quickly and in a stable fashion. That is, it is undesirable for the read pointer to overshoot the intended location, or to oscillate about the intended location by more than the minimum new rate estimate step size.

The flowchart in FIG. 8 illustrates a specific embodiment of the method in which the exemplary asynchronous sample rate estimator operates to adapt an error gain signal to calculate a new rate estimate. In step 82, FIFO CNT (i.e., phase error) is compared to a maximum value to determine whether the write pointer will overtake the read pointer in step 84. An input sample is written into a buffer and the write pointer is incremented in step 83 if FIFO CNT is less than the maximum value. Next, reciprocal frequency error generator 220 of FIG. 2 calculates a reciprocal frequency error in step 85. Rate estimator 240 then calculates a new rate estimate and adapts an error gain signal in steps 86 and 87, respectively. In one embodiment, step 88 detects and indicates whether the system has achieved a lock condition with respect to the input sample rate or frequency.

Figure 4:
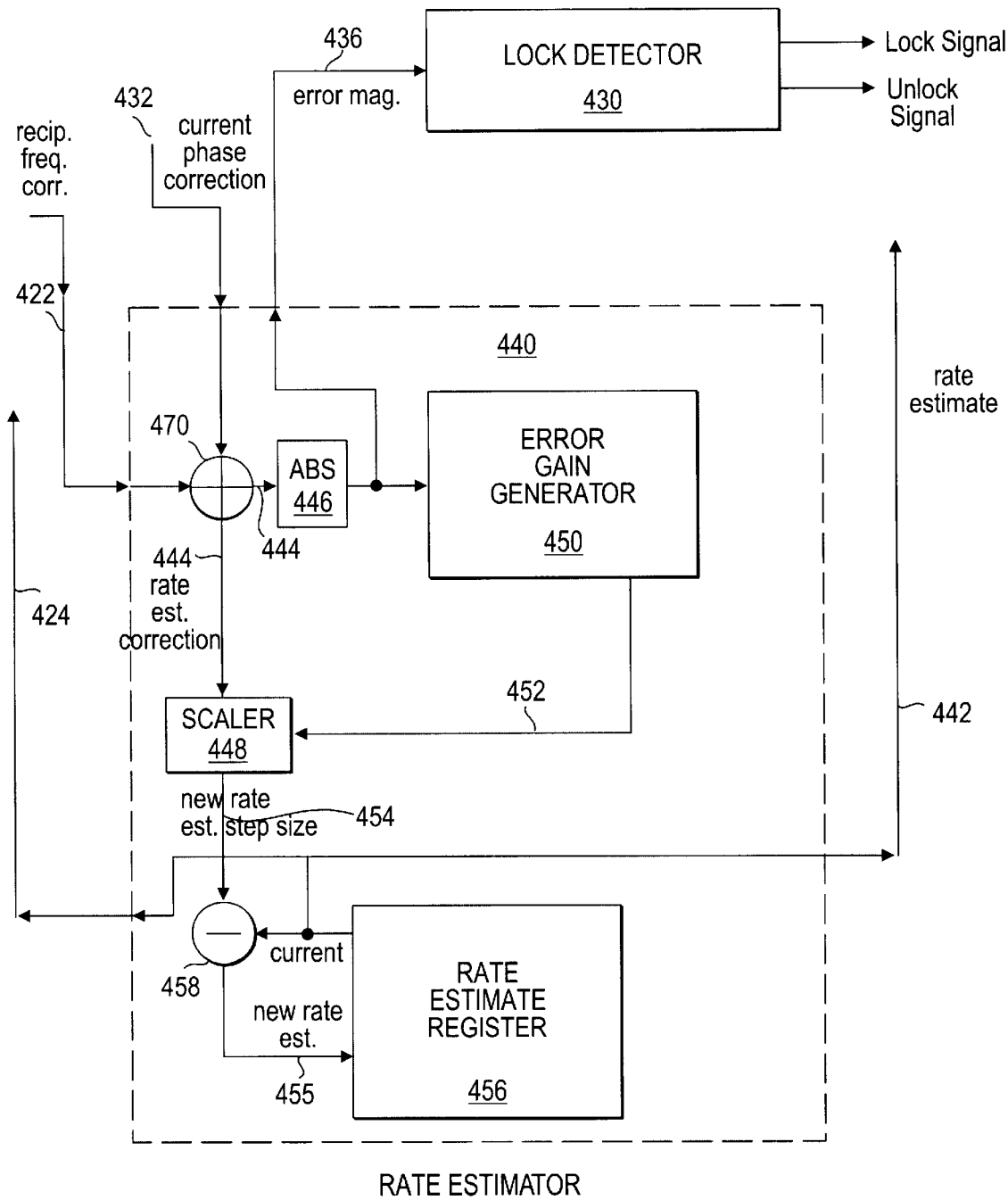
FIG. 4 is a simplified block diagram of an exemplary rate estimator.

FIG. 4 shows one embodiment of the rate estimator according to the present invention which "kicks" the read pointer to the correct location as discussed above. Exemplary rate estimator 440 includes adding unit 470 for summing reciprocal frequency error signal 422 and current phase correction signal 432, from reciprocal frequency error generator 220 and current phase correction register 234 of FIG. 2, respectively. The sum of reciprocal frequency error signal 422 and current phase correction signal 232 yields rate estimate correction signal 444. Summing unit 470 is configured also to provide rate estimate correction signal 444 to scaler 448 and to absolute value converter 446. Absolute value converter 446 operates to output the magnitude of rate estimate correction signal 444 which is referred in this application as the error magnitude signal. In one embodiment, error magnitude signal 436 is delivered to lock detector 430 and to error gain generator 450.

Scaler 448 receives rate estimate correction signal 444 and, for example, multiplies the signal by the output of error gain generator 450, which is referred herein as error gain 452. Scaler 448 is, for example, a multiplying unit, but could be a binary shift register. Since the rate estimate correction signal 444 is measured in a relatively coarse discrete step size, it must be scaled to provide new rate estimate step size 454 which is to be added or subtracted from the current rate estimate as the read rate converges to the write rate to obtain new rate estimate signal 455. Scaler 448 functions to scale rate estimate correction signal 444 to an appropriate step size for matching the write and read rates. Thus, scaler 448 is adapted to scale rate estimate correction signal 444 by error gain 452. The error gain, and its adaptation by error gain generator 450, filters out jitter of the discrete-time period measurement as determined by period determinator 360 of FIG. 3.

In operation, new rate estimate step size 454 starts out as a relatively large, but it quickly decreases as it is scaled down repetitiously until the rate estimate becomes close to the true rate (when the read rate is equal to the write rate). This allows the rate estimator to converge quickly as it approaches true pitch.

Subtracting unit 458 is configured to receive current rate estimate signal 424 and new rate estimate step size signal 454 for generating new rate estimate signal 455. Subtracting unit 458 is electrically coupled to rate estimate register 456 and operates to update the current rate estimate stored in register 456 with a new rate estimate, as provided by new rate estimate signal 455. The new rate estimate signal is derived from subtracting the new rate estimate step size from the current rate estimate. Rate estimate register 456 functions to provide the rate estimate signal 442 to, for example, the target circuitry and/or the phase corrector. In one embodiment of the rate estimator, rate estimate signal 442 is the current rate estimate signal 424. In another embodiment, rate estimate signal 442 is new rate estimate signal 455. It should be apparent to one skilled in the art of sample rate conversion that either the current or new rate estimate signals may be used for sample rate conversion.

The rate estimate may be represented as, for example, a fixed-point number in 3.19 format, thus providing a frequency resolution of 48,000/524,288 (the resident internal clock rate of 48 kHz divided by $2^{19}$), or 0.09 Hz. The maximum error gain, for example, may be 0.5 and the minimum error gain may be equal in magnitude to the least significant bit (LSB) of the rate estimate. These values provide a desirable balance between fast convergence while maintaining stability, but other values could have been chosen.

In one embodiment of asynchronous sample rate estimator 200 of FIG. 2, rate estimator 440 of FIG. 4 is configured to provide error magnitude signal 436 to lock detector 430. Lock detector 430, in turn, is adapted to provide either a system lock flag or a system unlock flag to other circuitry (not shown), such as a processor. Lock detector 430 and its operation is discussed further below.

Rate estimator 440 also includes error gain generator 450 configured to receive error magnitude signal 436 and for providing error gain signal 452 to scaler 448 and for calculating a new error gain. Error gain generator 450 is described in further detail in FIG. 5, which shows an exemplary error gain generator 500 according to the present invention. Error gain generator 500 is adapted to receive error magnitude signal 563 and to provide an error gain, if appropriate. Since realizable systems require quantized time measurements, a scaling term (i.e., $\alpha$) is needed to filter out jitter in the period measurement. This term is adaptive over time, allowing the new rate estimate step size 454 of FIG. 4 to approach zero as the frequency estimate becomes closer to the actual frequency.

Scaler 548 is adapted to receive error gain 552 (i.e., "scaling term") as determined by error gain generator 500 and new rate estimate step size 544. In operation, error gain 552 becomes smaller as the frequency estimate (i.e., rate estimate) grows closer to the actual source frequency. Error gain generator 500 according to the present invention is a stable, well-behaved system for adapting the scaling term. For example, a non-linear approach embodied within error gain generator 500 uses two buffers: step-down buffer 502 and step-up buffer 504.

In one embodiment of error gain generator 500, the buffers comprise counters, such as a first and a second counter. Each buffer increments each time a error magnitude signal meeting the buffer criteria occurs. The counter function is achieved by choosing the size of each buffer so that the buffer will overflow after the desired number of cycles occurs. The size, or width, of a buffer determines its time constant, that is, how long it will take the buffer to overflow at a given cycle rate. The time constant determines the time-to-lock, stability, and input frequency range of the phase-locked tracker.

For example, in a specific embodiment, the step-down buffer 502 is 9-bits wide, and therefore counts from 0 to 511. The step-up buffer 504 is 4-bits wide and counts from 0 to 15. The asymmetry between the width of the step-down buffer and the step-up buffer provides hysteresis, or damping, to the system, thus preventing oscillations and providing a stable lock, while allowing the system to respond quickly to changes in the input frequency. It is understood that a smaller or greater width could be chosen for any buffer according to the desired locking speed, stability, and trackable range.

In another embodiment of error gain generator 500, the first counter, on successive write cycles, counts the number of times the absolute value of the rate estimate correction signal (i.e., error magnitude) exceeds a first threshold, referred to as the STEP UP THRESHOLD. When the value of this counter equals a maximum, referred to as the STEP UP CNT MAX, first counter reset 508 sets step-up buffer 504 to zero and the error gain factor is loaded into register 518, where the factor is real number factor "a" 514, such as 2 (i.e., "double" the current error gain). The error gain factor is provided to error gain factor register 518 for storing and then multiplying factor "a" by the current error gain from current error gain register 520.

Also, the second counter counts the number of times the absolute value of the rate estimate correction signal is less than a second threshold, referred to as the STEP DOWN THRESHOLD. When the value of this counter equals a maximum, called the STEP DOWN CNT MAX, second counter reset 506 sets step-down buffer 502 to zero and the error gain factor is loaded into register 518, where the factor is fractional number factor "b" 516, such as ½ (i.e., "halve" the current error gain). In this case, fractional number "b" 516 is provided to error gain factor register 518 for storing and then multiplying "b" by the current error gain from current error gain register 520. In another embodiment, fractional number "b" may be any real number which causes the error gain to decrease, such as 0.707 or 0.3333.

Error scaler 522 is configured to determine the product of the error gain factor and the current error gain value, from their respective registers, and to provide that product to scaler 548. In one embodiment, the output of error scaler 522 (i.e., the error gain) is stored in current error gain register 520 until provided to scaler 548. In another embodiment, the asynchronous sample rate estimator provides timing (not shown) for conveying the error gain from current error gain register 520 to scaler 548 at the most opportune time to quickly generate the rate estimate. The error gain is provided to the scaler by way of error gain signal 552. In one embodiment of the error gain generator, error gain signal 552 is the current error gain. In another embodiment, error gain signal 552 is the new error gain signal. It should be apparent to one skilled in the art of sample rate estimation that either the current or new error gain signals may be used for sample rate estimation.

The current error gain is increased or decreased by a factor, whether real or fractional, each time an increase step size signal or a decrease step size signal is provided. For example, the real factor of 2 and the fractional factor of ½ are digital optimizations for the type of scaler used, which is either a shifter (e.g., barrel shifter) or a multiplying unit. In another embodiment, other values may be used, such as 3 and ⅓. In yet another embodiment, other values may not be inversely equivalent, such as "a" equal to 4 and "b" equal to ⅐. Values of both "a" and "b" are not limited to integer numbers and may have, for example, respective real number values of 2.95 and 0.3141.

So long as error magnitude 563 does not exceed either the STEP UP THRESHOLD or the STEP UP CNT MAX, however, no scaling will occur. For example, error comparator 510 monitors the state of the two buffers to determine whether both counters are less than their maximum thresholds. If so, comparator 510 causes the value of "one" 512 to be the next error gain factor to be placed in error gain factor register 518 to effectuate no scaling. That is, the current error gain value is multiplied by "1" so that during the next cycle, the error gain is the same as the previous cycle. Additionally, no scaling will occur if the current error gain is equal to either its maximum or minimum limits for the error gain, which is either ERROR GAIN MAX or ERROR GAIN MIN, respectively. In another embodiment, comparator 510 causes the current error gain to bypass the multiplier when scaling of the error gain factor is not required.

Thus, the error gain factor is updated with real number 514 each time step-up buffer 504 overflows, and is updated with fractional number 516 each time the step-down buffer 502 overflows. The buffers also receive a reset signal from counter reset 506 and 508 when the respective buffer overflows. Error gain generator 500 does not necessarily provide an error gain on every input cycle, as it typically takes several cycles to overflow a buffer. Therefore, the current error gain register holds its value until either the step-up buffer 504 or step-down buffer 502 overflows.

Although implementation of the following error gain adaptation process may be embodied in varying degrees of hardware and/or software, an illustrative error gain adaptation algorithm is contained within the following 'C' language snippet. It should be understood that other programming languages might be used.

```
freq_error_mag = fabs(freq_error_correction)
if(freq_error_mag < STEP_DOWN_THRESHOLD)
{
  ++step down ctr;
  if(step_down_ctr == STEP_DOWN_CNT_MAX)
  {
    step_down_ctr = 0;
    if(error_gain > ERROR_GAIN_MIN)
    {
      error_gain = error_gain / 2;
    }
  }
}
else if(freq_error_mag >= STEP_UP_THRESHOLD)
{
  ++step_up_ctr;
  if(step_up_ctr == STEP_UP_CNT_MAX)
  {
    step up ctr = 0;
    if(error_gain < ERROR_GAIN_MAX)
    {
      error_gain = error gain * 2;
    }
  }
}
```

Figure 5:
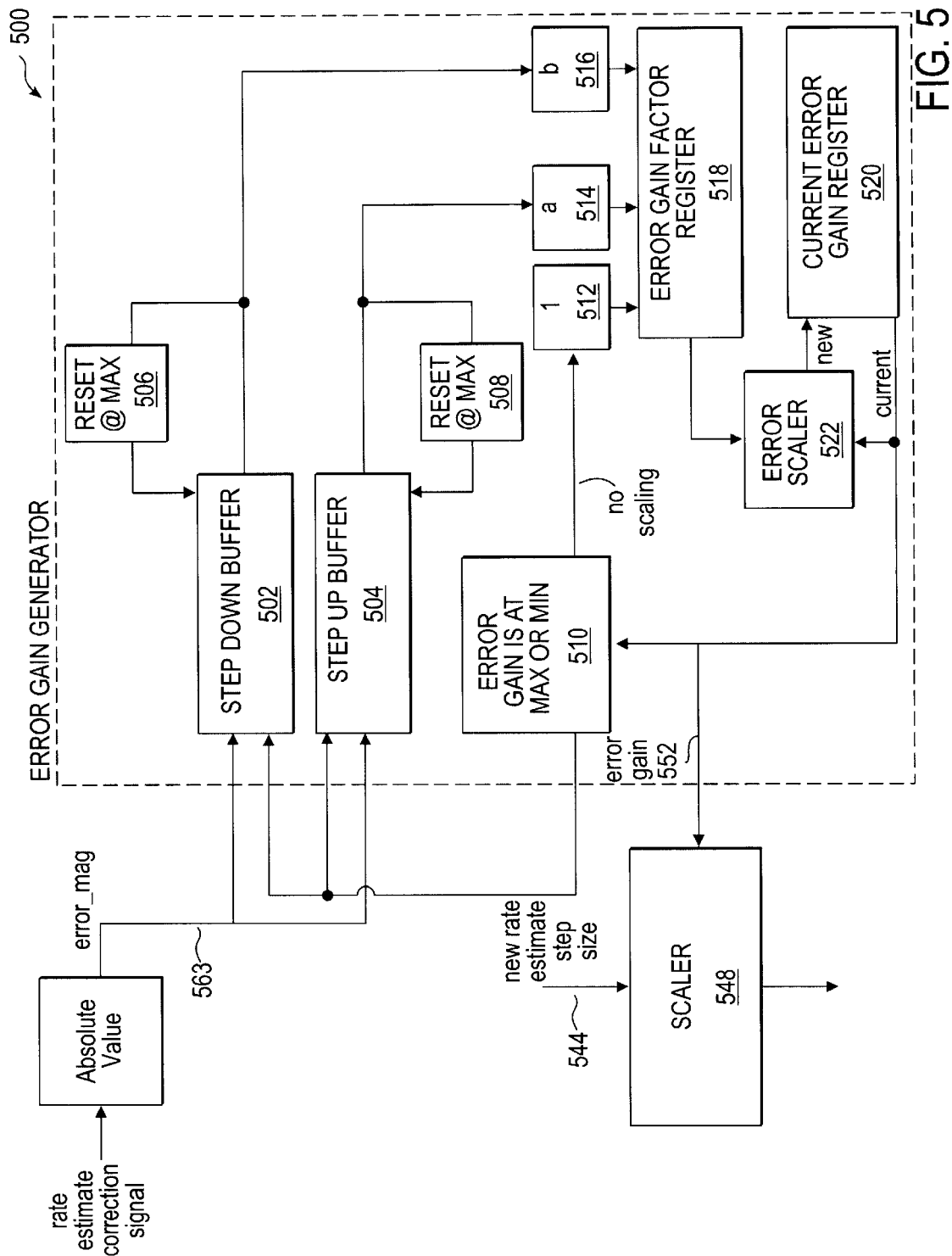
FIG. 5 is a simplified block diagram of an illustrative error gain generator.
Figure 10:
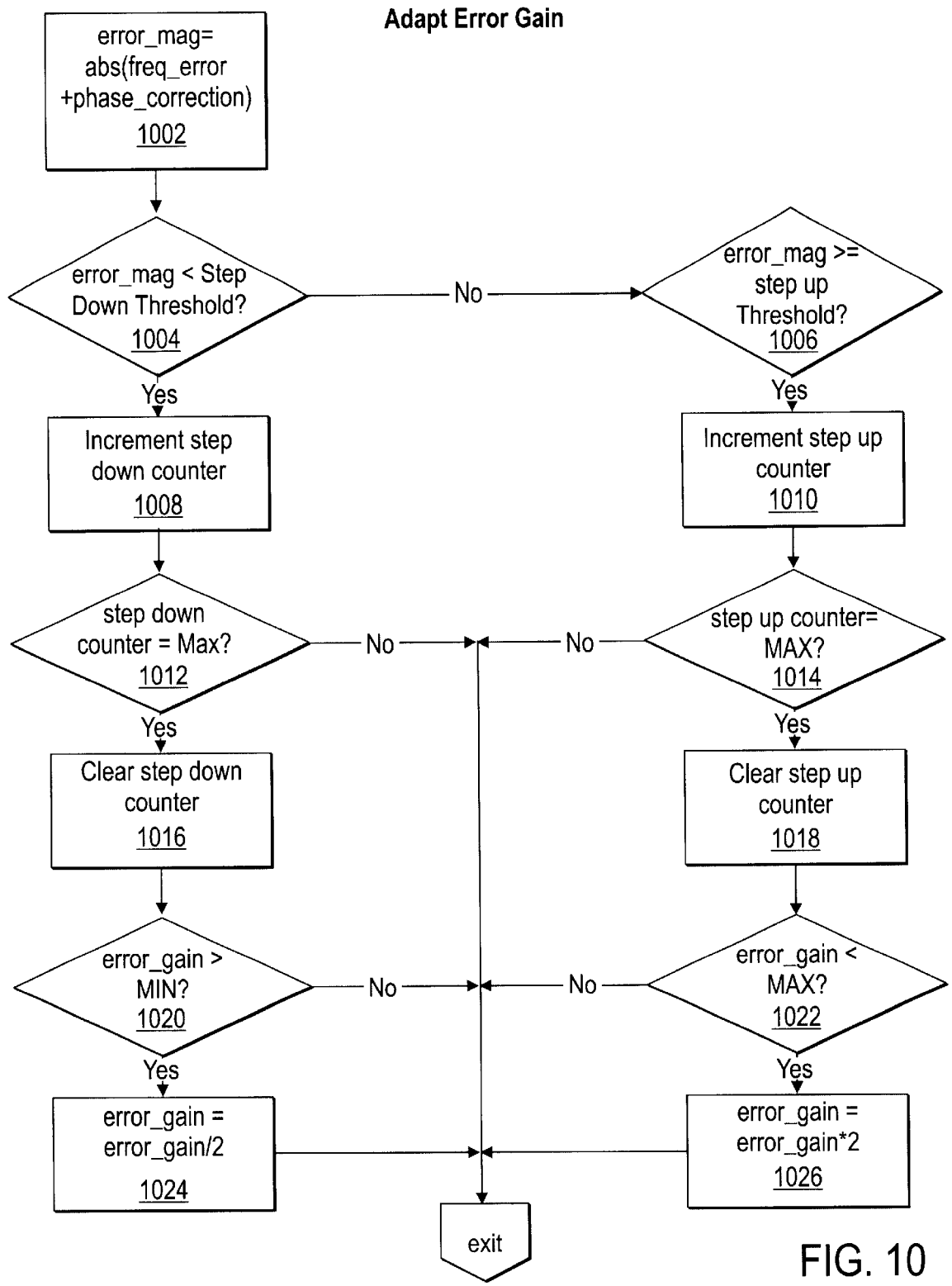
FIG. 10 is a simplified flowchart depicting a specific embodiment of a method for adapting an error gain.

The flowchart in FIG. 10 illustrates a specific embodiment of the method in which error gain generator 500 adapts an error gain factor as shown in FIG. 5. Step 1002 calculates the value of error magnitude 563 from the absolute value of the phase corrected reciprocal frequency error signal magnitude (i.e., reciprocal frequency error signal 422+current phase correction signal 432), which is also referred to the rate estimate correction signal described above. In steps 1004 and 1006, error magnitude 563 is compared to both a STEP DOWN THRESHOLD and a STEP UP THRESHOLD, respectively. In steps 1008 and 1010, the respective counter (i.e., STEP UP or STEP DOWN) is incremented when the preceding steps' respective criterion are met. In steps 1012 and 1014, the values in the STEP DOWN COUNTER or STEP UP COUNTER are compared to a respective maximum value. If neither is at the maximum value, then the error gain is not scaled or adapted (i.e., the error gain factor is neither "a" nor "b", but rather is "1"). If either of the respective counters have overflowed, however, then the counter that overflowed is cleared in either step 1016 or step 1018. In steps 1020 and 1022, the current error gain is compared to a minimum or a maximum error gain, depending on which counter overflowed. If the current error gain is equal to either its minimum or maximum values, then no scaling or adapting will result. If the error gain is between its minimum and maximum, the current error gain is scaled accordingly to generate a new error gain in respective steps 1024 and 1026.

Referring to FIG. 2, phase corrector 216 is configured to receive rate estimate 242 from rate estimator 240 (as discussed above in connection with FIG. 4) and to receive phase error signal 214. Furthermore, phase corrector 216 is configured to provide new phase correction signal 218 to rate estimator 240. Current phase correction register 234 is configured to provide the updated or new phase correction signal, which in turn is to be used further to generate a rate estimate. In operation, the phase corrector 216 maintains the correct phase separation between the read pointer and the write pointer while maintaining signal fidelity. Current phase correction signal 232 is used to bump, or "kick," the read pointer in the proper direction of the buffer addresses to maintain the desired separation between the read pointer and the write pointer (e.g. one half the buffer size, or eight addresses of separation). The phase corrector does this by modifying the rate estimate. In one embodiment, the current phase correction signal and the new phase correction signal are identical. In another embodiment, the current phase correction register is not included and the new phase correction signal is provided directly to the rate estimator.

Phase corrector 216 adapts and provides new phase correction signal 218 based on the phase error signal (i.e., FIFO_cnt) and rate estimate 242. Phase corrector 216 functions to center the input data 202 directed into buffer 204 by write pointer 206. Centering the input data in buffer 204 allows for both slowdown and speedup in the input stream.

Combining the parameters of the phase error and the rate estimate provides for efficient phase correction while avoiding undesirable audible events in the output signal. For example, if the current rate estimate is small, the system is considered locked and a momentary excursion outside of the desired phase window is expected and should be relatively benign. A large phase correction might result in a discontinuity in the data stream that manifests as an audible event on the output 209 of FIG. 2's target circuit 210. Therefore, if the current rate estimate is small, a smaller phase correction signal is desired, and should not result in a slower return to zero phase error because the read rate is very close to the write rate. The exact values are chosen according to system requirements, such as maximum allowable distortion, internal clock rate, allowable input rates, expected source stability, input buffer size, and output frequency range, among others.

Figure 6:
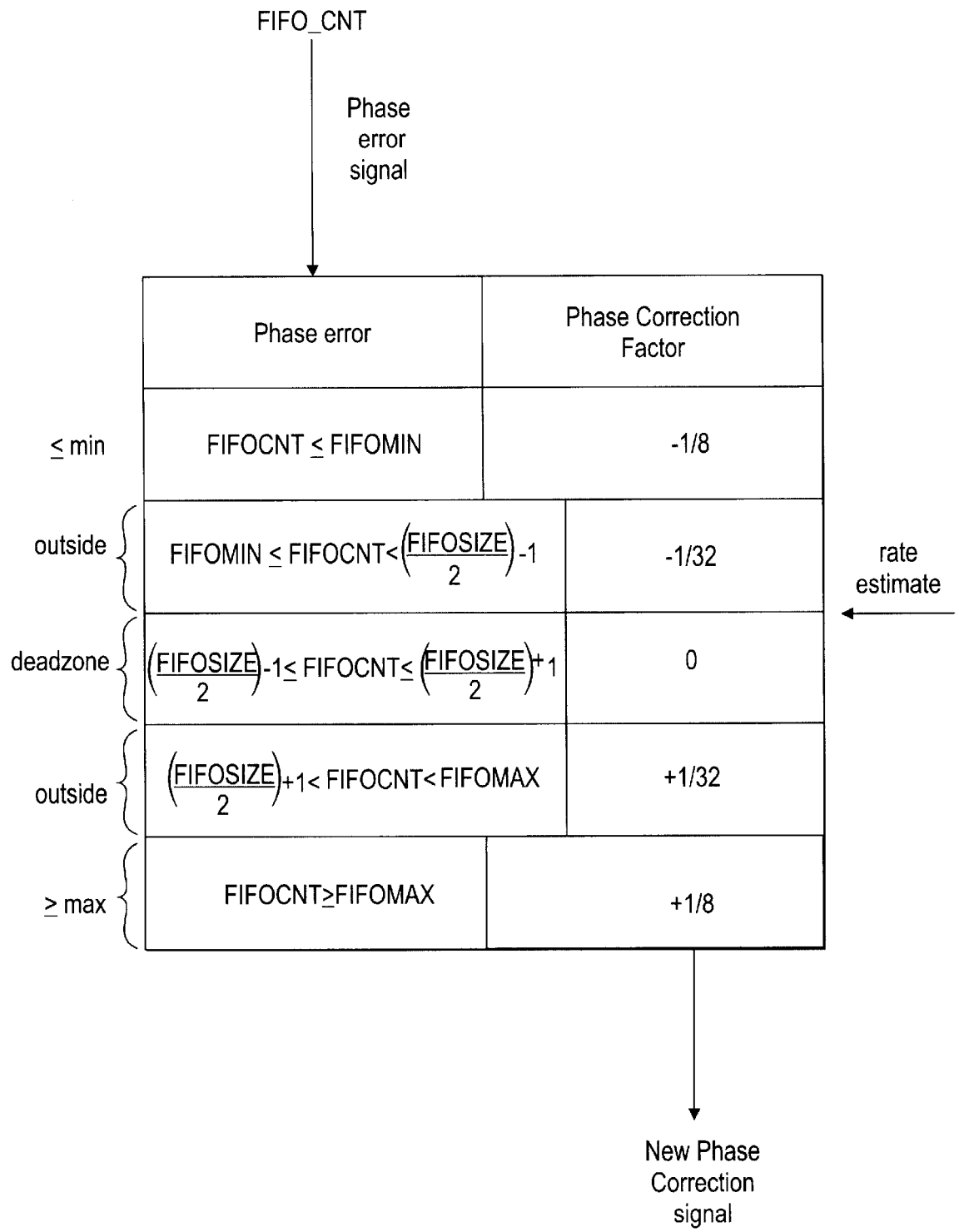
FIG. 6 is a table showing phase correction factors according to an embodiment of the present invention.

Phase corrector 216 functions to provide target circuit 210 with a rate estimate 242 that is phase corrected. Although the rate estimate will eventually converge on the actual frequency, the phases between the write and read pointers will not necessarily track each other. Therefore, a phase corrector is required to match phases. The phase correction signal is generated by rate estimate 242 and a phase correction factor, as illustrated in FIG. 6, which is based upon phase error 214, or the FIFO count ("FIFO CNT"). The phase correction factor, also referred as the FIFO centering correction factor, is calculated based on the number of elements in the FIFO.

Phase corrector 216 generates a variable new phase correction signal, where the value depends on at least three conditions. First, if input data 202 is centered within the "dead zone," no phase correction factor applies. The dead zone is a range centered around the FIFO's center, or half buffer point (e.g. 8 of 16), such as ±m points. For example, in a 16-point FIFO buffer, the dead zone represents separation between the read pointer and write pointer of 7, 8, or 9 buffer addresses, where m is ±1.

Second, if the phase error is outside of the dead zone range, the phase corrector inflates or deflates the rate estimate 442 by scaling the rate estimate by a factor of ±1/x, where x is, for example, 32. In one embodiment, when the phase difference between the write and read pointer is outside the deadzone, but is less FIFO MAX or is more than FIFO MIN, then a phase correction of ±(rate estimate)÷x is applied to coerce the phase difference to be within the desired range. In this situation, the input stream is centered outside the dead zone, but the FIFO buffer is partially full.

Third, if the phase error either is less than or equal to FIFO MIN, or is more than or equal to FIFO MAX, then a phase correction factor of ±(rate estimate)÷y is applied to the rate estimate, where y is, for example, 8. Here, the phase correction factor is selected to quickly accelerate the move into the center of the FIFO. An accelerated convergence time improves stability. In this situation, the input stream is centered outside the dead zone and the FIFO buffer either is completely full or completely empty.

During subsequent write cycles, phase corrector 216 evaluates whether another phase correction is appropriate. The flowchart in FIG. 9 illustrates a specific embodiment of the method in which phase corrector calculates the phase correction factor as shown in FIG. 6. With this inventive system, the audible effects of phase correction to small changes (such as ≈0.1%) in the input rate are minimized, while good response time and stability are maintained.

The following 'C' language snippet illustrates an algorithm according to one embodiment of the phase corrector:

```
if(fifo_cnt >= FIFOMAX)
    {
    phase_error = -rate_estimate/ 8.0;
    }
else if (fifo_cnt <= FIFOMIN)
    {
    phase_error = rate_estimate/ 8 0;
    }
else if (fifo_cnt > FIFO_CENTER+1)
    {
    phase_error = -rate_estimate/ 32.0;
    }
else if (fifo_cnt < FIFO_CENTER-1)
    {
    phase_error = rate_estimate/ 32.0;
    }
else
    {
    phase_error = 0.0;
    }
```

As discussed before, target circuit 210 is configured to receive the rate estimate 242. Furthermore, it is configured to provide output 209 signal at the desired output sample rate. In one embodiment of estimator 200, target circuit 210 is a convolver circuit which converts a nominal read rate to the system rate by interpolating or decimating data points in the data stream, as is known in the art. In one aspect, the convolver includes an N-deep delay line and an N-point finite-impulse-response ("FIR") filter, although other types of convolvers could be used. In another aspect, convolver 210 includes a fractional phase accumulator (not shown) provided to a N-point FIR so that the convolver can properly interpolate or decimated the read data to produce an output. The convolver may also include an integer phase accumulator wherein the number of buffer positions the read pointer should advance in the FIFO is contain there within.

In another embodiment of estimator 200, target circuit 210 is an application specific circuit that uses the rate estimate for determining an actual frequency from an external source, which is inputted into estimator 200. For example, target circuit 210 may provide output data representing the number of revolutions per minute ("rpm") of a rotating mechanical wheel at output 209. Other circuitry employing the sample rate estimator of the present invention would be readily apparent to one skilled in a particular art wherein accurate and precise frequency estimation is required.

One embodiment of exemplary asynchronous sample rate estimator 200 also includes lock detector as shown in FIG. 4. A system lock flag, or lock signal, indicates whether the rate estimation is valid by indicating that the system is locked. This flag, for example, can be used to mute the audio output from target circuit 210 to avoid audible distortion and noise when the sample rate estimator is not locked to the input. In operation, the lock detector 430 is configured to receive error magnitude signal 436 and to monitor whether the system is locked. If the system is locked, when the error magnitude signal exceeds a lock tolerance maximum, referred to as LOCK TOL MAX, lock detector 430 initiates a system unlocked signal. LOCK TOL MAX has the value of ($\frac{1}{2048}$), for example. If the system is unlocked and the error magnitude signal is below a lock tolerance minimum, referred to as LOCK TOL MIN, and the error gain is less than or equal to a multiple of the minimum error gain ERROR GAIN MIN, such as K·ERROR GAIN MIN, the lock detector 430 increments a counter. When the lock counter overflows, lock detector 430 initiates a system locked signal. In one embodiment K has the value of 8. In another embodiment, LOCK TOL MIN has the value of ($\frac{1}{2048}$), for example, and the LOCK TOL MAX is ($\frac{1}{512}$).

Figure 11:
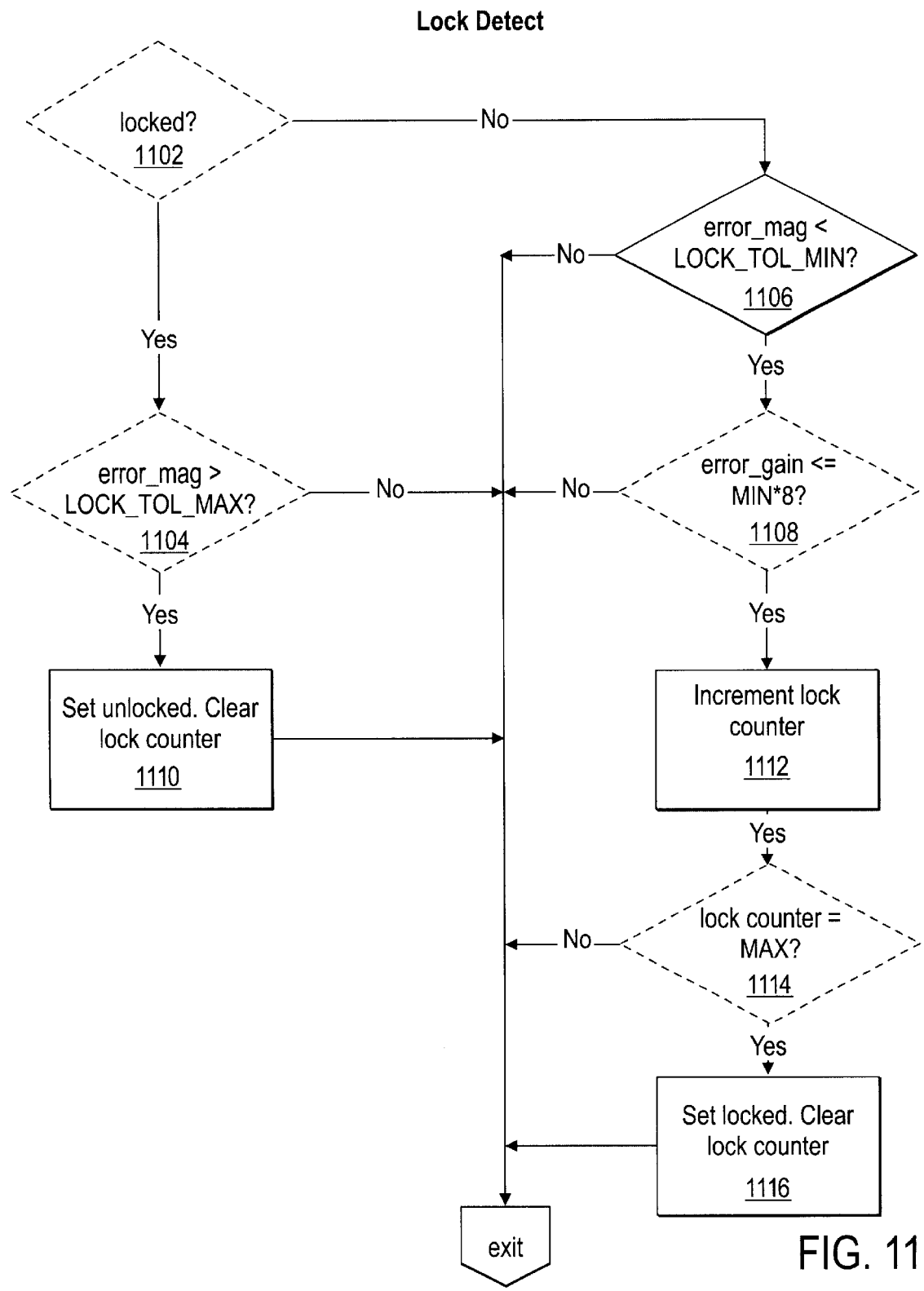
FIG. 11 is a simplified flowchart depicting showing a specific embodiment of a method for determining whether the system is locked to the incoming frequency.

The flowchart in FIG. 11 illustrates a specific embodiment of the method in which lock detector 430 indicates whether the system is locked. In step 1102, the lock detector determines whether system is currently locked. If the system is locked, and the error magnitude is greater than LOCK TOL MAX, then the detector indicates that the system is unlocked and the lock counter is cleared in step 1110. Otherwise, if the error magnitude is less than LOCK TOL MAX, then system remains in locked condition.

If the system is not initially locked, then in step 1106 the error magnitude is compared to a minimum value. If the error magnitude is not less than the minimum, then the system remains unlocked. If the error magnitude is less than LOCK TOL MIN, however, the error gain is then compared to a multiple of the minimum error gain, K·ERROR GAIN MIN. In step 1108, if the error magnitude is not less than or equal to the ERROR GAIN MIN, then the system remains unlocked. If less than or equal to the ERROR GAIN MIN, however, the lock counter is then incremented in step 1112. In step 1114, if the lock counter is less than a maximum, then the system remains unlocked. If the lock counter is equal to a maximum value, then the system is flagged as being locked and the lock counter is cleared in step 1116.

The following 'C' language snippet encapsulates an algorithm according to one embodiment of the lock detector:

```
if (rate_locked==0)
{
  if (freq_error_mag < LOCK_TOLERANCE_MIN && error_gain <=
  ERROR_GAIN_MIN*8)
  {
    if (lock_ctr++ == LOCK_CTR_MAX)
    {
      lock_ctr = 0;
      rate_locked = 1;
    }
  }
  else
  {
    lock_ctr = 0;
  }
}
else
{
  if (freq_error_mag > LOCK_TOLERANCE_MAX)
  {
    rate_locked = 0;
    lock_ctr = 0;
  }
}
```

In summary, a novel asynchronous sample rate estimator apparatus and method has been invented and is described herein.

The above description is illustrative and not restrictive. Many variations of the invention will become apparent to those skilled in the art upon review of this disclosure. For example, the apparatus and method need not be limited to realization in hardware, but also includes an embodiment substantially in computer software. Furthermore, the sample rate estimator according to the present invention need not be used to produce a converted sample rate of a digitized audio signal. For example, the rate estimate can be used to provide an accurate estimation of a frequency for a specific application in which a skilled artisan would readily appreciate the present invention. The scope of the invention should, therefore, be determined not with reference to the above description, but instead should be determined with reference to the appended claims along with their full scope of equivalents.

APPENDIX A

Appendix A contains an exemplary source code listing which should be consulted for further details on the features of the present invention.

```
/
***********************************************************************
* Simulation of Asynchronous Sample Rate Converter Pitch Extractor
* This architecture uses the reciprocal relationship of estimated
* pitch and measured period to adapt the estimated pitch.
* Copyright by Creative Technology, Ltd. All Right Reserved
* Author:   Tom Savell
***********************************************************************/
#define IN_PRECISION 2048
#define OUT_PRECISION (65536*8)
#define SAMPLE_RATE 48000.0
#define CLOCK_FREQ (SAMPLE_RATE*IN_PRECISION)
```

APPENDIX A-continued

Appendix A contains an exemplary source code listing which should be consulted for further details on the features of the present invention.

```c
#define DEFAULT_FREQ (SAMPLE_RATE + 10.0)
#define PRINT_DETAIL 1
#define LOCK_TOLERANCE_MIN (1.0/IN_PRECISION)
#define LOCK_TOLERANCE_MAX (4.0/IN_PRECISION)
#define LOCK_CTR_MAX 15
#define ERROR_GAIN_MAX 0.5
#define ERROR_GAIN_MIN (1.0/OUT_PRECISION)
#define STEP_DOWN_THRESHOLD (1.0/IN_PRECISION)
#define STEP_DOWN_CNT_MAX 511
#define STEP_UP_THRESHOLD STEP_DOWN_THRESHOLD
#define STEP_UP_CNT_MAX 15
#define FIFO_CENTER 8
#define FIFO_MIN 1
#define FIFO_MAX 15
#define BUFFER_SIZE 32
#include <stdio.h>
#include <math.h>
#include <sys/timeb.h>
#include <sys/types.h>
main(argc,argv)
int argc;
char *argv[ ];
{
    int
        sctr = 0,
        sample_ctr = 0,
        rate_locked = 0,
        lock_ctr = 0,
        seconds,
        millisec,
        in_period=0,
        last_in_time=0,
        step_down_ctr=0,
        step_up_ctr=0,
        fifo_cnt = FIFO_CENTER,
        write_ptr = FIFO_CENTER,
        read_ptr = 0,
        new_fifo_cnt,
        new_read_ptr,
        rate_only=0;
    double  async_freq              = DEFAULT_FREQ,
            async_phase             = 0.0,
            freq_estimate           = 000.0,
            rate_estimate           = 0.0,
            sync_phase              = 0.0,
            reciprocal_freq_error   = 0.0,
            freq_error_correction   = 0.0,
            phase_error             = 0.0,
            freq_error_mag          = 0.0,
            error_gain              = ERROR_GAIN_MAX,
            sim_time                = 0.0,
            max_sim_time            = 5.0;
struct timeb starttime,endtime;
/*************************************************************
 * process input command line arguments
 *************************************************************/
    while (--argc > 0 && (*++argv) [0] == '-')
    {
        switch ((*argv) [1])
        {
            case 's': /* set initial input sample rate */
                sscanf( (&((*argv) [2])), "%lf",&async_freq);
                fprintf(stderr,"async_freq = %lf\n",async_freq);
                break;
            case 't': /* set max simulation time */
                sscanf( (&((*argv) [2])), "%lf",&max_sim_time);
                fprintf(stderr,"max_sim_time set to %lf\n",max_sim_time);
                break;
            case 'r': /* print rate only */
                if ((*argv) [2]=='\0')
                    rate_only = 1;
                else
                    sscanf( (&((*argv) [2])),"%d",&rate_only);
                break;
            case 'h': /* help */
                usage( );
```

APPENDIX A-continued

Appendix A contains an exemplary source code listing which should be consulted for further details on the features of the present invention.

```
                break;
        }
    }
/***********************************************************************
 ********************************************************************/
rate_estimate = 0.0;
freq_estimate = 0.0;
sync_phase = 0.0;
phase_error= 0.0;
ftime( &starttime );
fprintf(stderr,"Sample Rate = %5.1f\nAsync Rate =
%5.1f\n",SAMPLE_RATE,async_freq);
while (sim_time < max_sim_time) {
        sctr = (sctr+1) & (IN_PRECISION-1); /* SCTR counts IN_PRECISION clocks/out
sample */
        async_phase += async_freq/CLOCK_FREQ; //(48000.0*IN_PRECISION);     /* Create
async input */
        if (async_phase >= 1.0) {
                // asynchronous input sample arrived
                async_phase -= (int)async_phase;
                if (fifo_cnt <= FIFO_MAX)
                        {
                        if (++write_ptr==BUFFER_SIZE) write_ptr=0;  // Simulate FIFO load of
this sample
                        }
                fifo_cnt = write_ptr - read_ptr;
                if (fifo_cnt < 0) fifo_cnt += BUFFER_SIZE;
// Calculate error signal and apply to the rate_estimate
                // First, coerce the fifo count to stay in the middle
                if (fifo_cnt >= FIFO_MAX)
                        {
                        phase_error = -rate_estimate/8.0;
                        }
                else if (fifo_cnt <= FIFO_MIN)
                        {
                        phase_error = rate_estimate/8.0;
                        }
                else if (fifo_cnt > FIFO_CENTER+1)
                        {
                        phase_error = -rate_estimate/32.0;
                        }
                else if (fifo_cnt < FIFO_CENTER-1)
                        {
                        phase_error = rate_estimate/32.0;
                        }
                else
                        {
                        phase_error = 0.0;
                        }
                // Calculate and accumulate the reciprocal error signal
                reciprocal_freq_error = (((double)in_period/(double)IN_PRECISION) *
rate_estimate) - 1.0;
                freq_error_correction = reciprocal_freq_error + phase_error;
                rate_estimate -= (freq_error_correction) * error_gain;
                if (rate_estimate < 0) rate_estimate = 0;
                freq_estimate = rate_estimate * SAMPLE_RATE;//48000.0;
                in_period = sample_ctr*IN_PRECISION + sctr - last_in_time;
                last_in_time = sample_ctr*IN_PRECISION + sctr;
                // Adapt error gain
                freq_error_mag = fabs(freq_error_correction);
                if (freq_error_mag < STEP_DOWN_THRESHOLD)
                        {
                        ++step_down_ctr;
                        if (step_down_ctr == STEP_DOWN_CNT_MAX)
                                {
                                step_down_ctr = 0;
                                if (error_gain > ERROR_GAIN_MIN)
                                        {
                                        error_gain = error_gain / 2;
                                        }
                                }
                        }
                else if (freq_error_mag >= STEP_UP_THRESHOLD)
                        {
                        ++step_up_ctr;
                        if (step_up_ctr == STEP_UP_CNT_MAX)
```

APPENDIX A-continued

Appendix A contains an exemplary source code listing which should be consulted for further details on the features of the present invention.

```
            {
                step_up_ctr = 0;
                if (error_gain < ERROR_GAIN_MAX)
                    {
                    error_gain = error_gain * 2;
                    }
                }
            }
    // Detect locked/unlocked
    if (rate_locked==0)
            {
            if (freq_error_mag < LOCK_TOLERANCE_MIN && error_gain <=
ERROR_GAIN_MIN*8)
                    {
                    if (lock_ctr++ == LOCK_CTR_MAX)
                            {
                            lock_ctr = 0;
                            rate_locked=1;
                            fprintf(stderr,"!L!\n");
                            }
                    }
            else
                    {
                    lock_ctr = 0;
                    }
            }
    else
            {
            if (freq_error_mag > LOCK_TOLERANCE_MAX)
                    {
                    rate_locked=0;
                    lock_ctr = 0;
                    fprintf(stderr,"!U!\n");
                    }
            }
#if PRINT_DETAIL
        if (rate_only == 1)
                printf("%lf\n",freq_estimate);
        else if (rate_only == 2)
                printf("%lf\t%ld\n",freq_estimate,in_period);
        else if (rate_only == 0)
                printf("%1.2f ms %lf %+lf %lf %lf %d %d %d %d\n",
(double)sample_ctr/(SAMPLE_RATE/1000),freq_estimate,freq_error_correction,freq_e
rror_mag,error_gain,in_period,fifo_cnt,lock_ctr,rate_locked);
#endif
        }
    if (sctr == IN_PRECISION-1) {    /* At 48 kHz rate */
        ++sample_ctr;
        sync_phase += rate_estimate;
        if (sync_phase > 1.0) {
            new_read_ptr = read_ptr + (int)sync_phase;
            if (new_read_ptr>=BUFFER_SIZE) new_read_ptr-=BUFFER_SIZE;   //
Simulate FIFO dump of this sample
            new_fifo_cnt = write_ptr - new_read_ptr;
            if (new_fifo_cnt < 0) new_fifo_cnt += BUFFER_SIZE;
            if (new_fifo_cnt>fifo_cnt)
                    {
                    read_ptr = write_ptr;
                    }
            else
                    {
                    read_ptr = new_read_ptr;
                    }
            fifo_cnt = write_ptr - read_ptr;
            if (fifo_cnt < 0) fifo_cnt += BUFFER_SIZE;
            sync_phase -= (int)sync_phase;
        }
#if 1
        if (sample_ctr%((int)SAMPLE_RATE) == 0)
                {
                seconds = (int)sample_ctr/((int)SAMPLE_RATE);
                if (seconds == 1)
                        {
                        async_freq = async_freq - async_freq/1000;   /* step change of -
0.1% */
                        fprintf(stderr,"Step change of input freq! New freq ==
```

APPENDIX A-continued

Appendix A contains an exemplary source code listing which should be consulted for further details on the features of the present invention.

```
%5.6f\n",async_freq);
                }
            else if (seconds == 2)
                {
                async_freq = async_freq * 2.0/3.0;              /* step change of -33% */
                fprintf(stderr,"Step change of input freq! New freq == %5.6f\n",async_freq);
                }
            else if (seconds == 3)
                {
                async_freq = async_freq + async_freq/1000;   /* step change of +0.1% */
                fprintf(stderr,"Step change of input freq! New freq == %5.6f\n",async_freq);
                }
            else if (seconds == 4)
                {
                async_freq = async_freq * 1.65;    /* step change of +65% */
                fprintf(stderr,"Step change of input freq! New freq == %5.6f\n",async_freq);
                }
            }
#endif
        sim_time = (float)sample_ctr/SAMPLE RATE;
    }
}
ftime( &endtime );
seconds = endtime.time - starttime.time;
millisec = endtime.millitm - starttime.millitm;
seconds += (int)(millisec/1000);
millisec %= 1000;
fprintf(stderr,"Done! sample_ctr = %d\tSimulated time: %1.3f seconds\nExecution time: %hu.%hu seconds\n",
        sample_ctr,sim_time,seconds,millisec);
}
usage( )
{
        /* print usage for program */
fprintf(stderr,"%s%s%s%s%s",
"usage:   asyncconv [-cCLOCKCOUNT -sINFREQ -f -h]\n",
"         -tMAXSIMTIME:   Run for MAXSIMTIME seconds (dflt 4.0).\n",
"         -sINFREQ:       Set input frequency to INFREQ (48.010kHz).\n",
"         -h              Prints this message.\n");
exit(0);
}
```

What is claimed is:

1. An asynchronous sample rate estimating apparatus having an output data rate, the apparatus comprising:

an input to receive a plurality of input data samples in a periodic data stream and to generate a phase error signal based upon the input data samples;

a phase corrector configured to receive the phase error signal and to produce a phase correction signal;

a reciprocal frequency error generator configured to receive a measured period and a current rate estimate to provide a reciprocal frequency error signal; and a summing unit configured to receive the reciprocal frequency error signal and the phase correction signal and configured to provide a rate estimate correction signal, wherein the rate estimate correction signal is used to generate a new rate estimate of the periodic data stream.

2. The apparatus of claim 1, further comprising:

a serial buffer configured to receive input data at an input data rate;

a write pointer at a first buffer position, the write pointer configured to move to a second buffer position at the input sample rate;

a read pointer at a third buffer position, the read pointer configured to move to a fourth buffer position at a read rate, the read pointer being separated from the write pointer by a phase angle; and a phase detector configured to detect the first buffer position and the third buffer position and producing the phase error signal, the phase error signal indicating the difference between the phase angle and a desired phase angle.

3. The apparatus of claim 1, further comprising:

a error gain generator configured to receive the rate estimate correction signal to adapt a current error gain signal and configured to provide an error gain signal; and a scaler configured to receive the reciprocal frequency error signal and the error gain signal and configured to produce a rate estimate step size.

4. The apparatus of claim 1, further comprising a clock for providing the measured period having a measured period amplitude.

5. The apparatus of claim 1, further comprising:

a subtracting unit configured to receive the new rate estimate step size and to provide a new rate estimate signal having a new rate estimate signal amplitude; and a rate estimate register, the rate estimate register configured to provide a current rate estimate signal having a current rate estimate signal amplitude to the subtracting unit to update the rate estimate register contents with the new rate estimate signal received from the subtracting unit, wherein the rate estimate register is configured to provide the rate estimate signal to the phase corrector and is coupled to the reciprocal frequency error generator to provide the current rate estimate.

6. The apparatus of claim 1, further comprising a lock indicator configured to receive the absolute value of the rate estimate correction signal and to produce a lock indicating signal when an error magnitude is less than a lock tolerance minimum while the current error gain is less than or equal to a multiple of the error gain minimum, the lock indicator configured further to produce an unlocked indicating signal when the error magnitude is more than a lock tolerance maximum.

7. The apparatus of claim 1, further comprising a sample rate converter circuit configured to receive the rate estimate signal to convert the input data samples in a periodic data stream at the input data rate to an equivalent output data sample stream at the output data rate.

8. The apparatus of claim 1, wherein the reciprocal frequency error generator further comprises:
   a multiplier unit configured to receive the measured period amplitude and the current rate estimate for producing a reciprocal product; and
   a summing unit configured to receive the reciprocal product and a de-biasing signal to generate the reciprocal frequency error signal having a reciprocal frequency error signal magnitude,
   wherein the de-biasing signal removes a bias from the reciprocal product, the de-biasing signal having a value of negative one.

9. The apparatus of claim 3, wherein the error gain generator further comprises:
   a first counter configured to respond to the number of times an error magnitude signal exceeds a first threshold and configured further to produce a first error gain factor when the first counter reaches a first counter limit;
   a second counter configured to respond to the number of times the error magnitude signal exceeds a second threshold and configured further to produce a second error gain factor when the second counter reaches a second counter limit;
   a comparator configured to compare the current error gain signal to an error maximum and an error minimum, where the current error gain signal is not adapted if the current error gain signal is equal to the error maximum or the error minimum;
   an error gain factor register configured to receive an error gain factor; and a current error gain register configured to provide the error gain signal.

10. The apparatus of claim 9, further comprising an error scaler configured to receive the error gain factor and the current error gain signal for producing a new error gain signal.

11. The apparatus of claim 9, wherein the first error gain factor is configured to increase the error gain factor.

12. The apparatus of claim 9, wherein the second error gain factor is configured to decrease the error gain factor.

13. The apparatus of claim 9, wherein the first counter and the second counter is an overflow buffer.

14. The apparatus of claim 1, wherein the input sample rate is essentially equal to the output data rate.

15. An asynchronous digital sample rate estimating apparatus for use with an asynchronous digital rate converter, the asynchronous digital rate converter having an output data rate, the apparatus comprising:
   a buffer configured to receive input data at an input data rate;
   a write pointer at a first buffer position, the write pointer configured to move to a second buffer position at the input sample rate;
   a read pointer at a third buffer position, the read pointer configured to move to a fourth buffer position at a read rate, the read pointer being separated from the write pointer by a phase angle;
   a phase detector configured to detect the first buffer position and the third buffer position and producing a phase error signal, the phase error signal indicating the difference between the phase angle and a desired phase angle;
   a phase corrector configured to receive the phase error signal and a rate estimate signal to produce a phase correction signal;
   a period determinator configured to receive an input sample and a clock to provide a measured period having an measured period amplitude;
   a reciprocal frequency error generator configured to receive the measured period and a current rate estimate to provide a reciprocal frequency error signal having a reciprocal frequency error signal amplitude; and
   a summing unit configured to receive the reciprocal frequency error signal and the phase correction signal, and configured further to provide a rate estimate correction signal, wherein the rate estimate correction signal is used to generate a new rate estimate.

16. The apparatus of claim 15, further comprising:
   a error gain generator configured to receive the rate estimate correction signal to adapt a current error gain signal and configured further to provide an error gain signal, wherein the error gain generator further includes:
   a first counter configured to respond to the number of times an error magnitude signal exceeds a first threshold, the first counter configured further to produce a first error gain factor when the first counter reaches a first counter limit;
   a second counter configured to respond to the number of times the error magnitude signal exceeds a second threshold, the second counter configured further to produce a second error gain factor when the second counter reaches a second counter limit; a comparator configured to compare the current error gain signal to an error maximum and an error minimum, where the current error gain signal is not adapted if the current error gain signal is equal to either the error maximum or the error minimum;
   an error gain factor register configured to receive an error gain factor, the error gain factor based upon a condition of the first or the second counters;
   a current error gain register configured to provide the current error gain signal, the current error gain signal based upon the error gain factor; and
   an error scaler configured to receive the error gain factor and the current error gain signal to produce a new error gain signal; and a scaler configured to receive the rate estimation correction signal and the error gain signal and configured further to produce a new rate estimate step size.

17. An asynchronous sample rate estimating apparatus comprising:

a first-in-first-out buffer configured to receive input data at an input data rate;

a write pointer configured to indicate a next data input position in the buffer, the write pointer configured to move to the next data input position at the input data rate;

a read pointer configured to indicate a next data output position in the buffer, the read pointer configured to move to the next data output position according to a rate estimate signal;

a phase detector configured to provide a phase error signal;

a reciprocal frequency error generator configured to receive a current rate estimate and a measured period to provide a reciprocal frequency error signal;

a rate estimator configured to receive the reciprocal frequency error signal and a phase correction signal to provide a rate estimate signal; and a phase corrector configured to receive the phase error signal and the rate estimate signal to produce the phase correction signal, wherein the rate estimate signal is used to determine a frequency estimate of the input data rate.

18. The apparatus of claim 17, wherein the write pointer is separated from the read pointer by an approximate fixed-phase separation.

19. The apparatus of claim 17, wherein the approximate fixed phase separation is approximately 180 degrees.

20. The apparatus of claim 17, further comprising a lock indicator configured to receive the absolute value of the rate estimate correction signal, the lock indicator producing a lock flag when an error magnitude is less than a lock tolerance minimum while the current gain error is less than or equal to a multiple of the error gain minimum, and producing an unlocked flag when the error magnitude is more than a lock tolerance maximum.

21. A method for estimating the frequency of an asynchronous signal comprising:

receiving a sampled asynchronous signal input;

determining a measured sample period by evaluating a plurality of clock cycles between the sampled asynchronous signal input and a previously sampled asynchronous signal input;

updating a reciprocal frequency error signal based upon the measured sample period and a rate estimate;

generating a phase correction signal for centering a write pointer in a FIFO containing the sampled asynchronous signal input; and generating a rate estimate correction signal from the reciprocal frequency error signal and a current phase correction signal.

22. The method of claim 21, further comprising:

adapting a current error gain to provide an error gain; and scaling the rate estimate correction signal to generate a new rate estimate step size, wherein the new rate estimate step size is used to approximate an estimated frequency to an actual frequency.

23. The method of claim 22, further comprising:

monitoring a system lock detector; and looping through the previous steps until a system lock is detected thus indicating the rate estimate is equivalent to the actual frequency.

24. The method of claim 21, wherein determining the measured sample period further comprises:

incrementing a period counter for each clock edge during a time from a previous asynchronous signal input sample arrival to a next asynchronous signal input sample arrival; and determining an estimated period of the asynchronous signal based upon a number of clock edges during the time between the previous and the next asynchronous signal input sample arrivals.

25. The method of claim 21, wherein generating the new phase correction signal further comprises:

updating a phase correction factor based on the phase error signal amplitude; and scaling the rate estimate by the phase correction factor, wherein a scaled rate estimate is the new phase correction signal.

26. The method of claim 21, wherein updating the reciprocal frequency error further comprises:

determining a reciprocal product by multiplying the measured sample period with the current rate estimate, where the reciprocal product includes a bias; and removing the bias from the reciprocal product by subtracting one from the reciprocal product, wherein an unbiased reciprocal product is the reciprocal frequency error signal having a reciprocal frequency error signal magnitude.

27. The method of claim 21, wherein generating the rate estimate further comprises:

adding the reciprocal frequency error signal and the new phase correction signal to obtain a rate estimate correction signal;

scaling the rate estimate correction signal by the error gain for generating a new rate estimate step size; and generating a new rate estimate by subtracting the new rate estimate step size from the current rate estimate, wherein the new rate estimate is used to provide the rate estimate.

28. The method of claim 22, wherein adapting the current error gain further comprises:

generating a error magnitude signal by determining an absolute magnitude of the rate estimate correction signal;

determining a first number of occurrences in which the error magnitude signal is greater than or equal to a first gain threshold;

determining a second number of occurrences in which the error magnitude signal is less than a second gain threshold;

determining a new error gain by increasing the current error gain when the first number of occurrences is equal to a step-up maximum while the current error gain is less than an error-gain maximum;

determining the new error gain by decreasing the current error gain when the second number of occurrences is equal to a step-down maximum while the current error gain is more than an error-gain minimum;

determining the new error gain by using the current error gain when the first number of occurrences is less than the step-up maximum and the second number of occurrences is less than the step-down maximum; and supplying the new error gain to scale the rate estimate correction signal, wherein the scaled rate estimate correction signal is the new rate estimate step size.

29. The method of claim 23, wherein monitoring a system lock detector further comprises:

generating a error magnitude signal by determining the absolute magnitude of the rate estimate correction signal;

monitoring the error magnitude signal;

determining a number of occurrences in which the error magnitude signal is less than a lock tolerance minimum while the current error gain is less than or equal to a real number multiple of the error gain minimum;

generating a system locked signal when the number of occurrences equals maximum number; and generating a system unlocked signal when the error magnitude signal is more than a lock tolerance maximum.

30. An apparatus for indicating a locked condition of an asynchronous sample rate estimating circuit, the apparatus comprising:

a phase detector configured to provide a phase error signal;

a reciprocal frequency error generator configured to receive a current rate estimate and a measured period to provide a reciprocal frequency error signal;

a rate estimator configured to receive the reciprocal frequency error signal and a phase correction signal to provide a rate estimate signal and the current rate estimate, the rate estimator including a summing unit configured to receive the reciprocal frequency error signal and the phase correction signal to generate a rate estimate correction signal;

a phase corrector receiving the phase error signal and the rate estimate signal to produce the phase correction signal; and a lock indicator configured to receive an absolute value of the rate estimate correction signal, wherein the lock indicator produces a system lock flag when a number of occurrences equals a maximum occurrence number and produces a system unlocked flag when an error magnitude signal is more than a lock tolerance maximum, where the maximum occurrence number is the number of times in which the error magnitude signal is less than a lock tolerance minimum while the current gain error is less than or equal to a real number multiple of an error gain minimum.

31. An asynchronous sample rate estimating apparatus having an output data rate, the apparatus comprising:

an input configured to provide a measured period signal in response to input data samples in a periodic data stream;

a phase detector to generate a phase error signal;

a phase corrector configured to receive the phase error signal and to produce a phase correction signal;

a reciprocal frequency error generator configured to receive the measured period signal and a rate estimate signal and to provide a reciprocal frequency error signal; and a summing unit configured to receive the reciprocal frequency error signal and the phase correction signal and configured to provide a rate estimate correction signal, wherein the rate estimate correction signal is used to generate a new rate estimate signal.

32. The apparatus of claim 31, wherein the phase corrector receives the rate estimate signal and scales a rate estimate by a phase error to produce the phase correction signal.

33. The apparatus of claim 31, further comprising:

a write pointer at a first buffer position, the write pointer configured to move to a second buffer position at the input sample rate; and a read pointer at a third buffer position, the read pointer configured to move to a fourth buffer position at a read rate indicated by the rate estimate signal, the read pointer being separated from the write pointer by a phase angle.

34. The apparatus of claim 33, wherein the phase detector is configured to receive the write pointer and the read pointer and produce the phase error signal, the phase error signal indicating the difference between the phase angle and a desired phase angle.

35. The apparatus of claim 33, further comprising a buffer configured to receive the input data samples at an input data rate and wherein each the input data sample is written to a buffer position indicated by the write pointer and data is read from a buffer position indicated by the read pointer.

36. The apparatus of claim 31, further comprising:

an error magnitude generator configured to receive the rate estimate correction signal and produce an error magnitude signal; and an error gain generator configured to receive the error magnitude signal and provide the error gain signal; and a scaler configured to receive the reciprocal frequency error signal and the error gain signal and produce a rate estimate step size.

37. The apparatus of claim 36, wherein the error magnitude signal is equal to the absolute value of the rate estimate correction signal.

38. The apparatus of claim 31, further comprising:

a subtracting unit configured to receive the rate estimate correction signal and the rate estimate signal and provide the new rate estimate signal; and a rate estimate register configured to receive the new rate estimate signal from the subtracting unit, wherein the rate estimate register is configured to provide the rate estimate signal.

39. The apparatus of claim 36, further comprising:

a subtracting unit configured to receive the rate estimate step size and the rate estimate signal and provide a new rate estimate signal; and a rate estimate register, the rate estimate register configured to receive the new rate estimate signal from the subtracting unit, wherein the rate estimate register is configured to provide the rate estimate signal.

40. The apparatus of claim 36, wherein the error gain generator further comprises:

a first counter configured to respond to the number of times the error magnitude signal exceeds a first threshold and configured further to produce a first error gain factor when the first counter reaches a first counter limit;

a second counter configured to respond to the number of times the error magnitude signal exceeds a second threshold and configured further to produce a second error gain factor when the second counter reaches a second counter limit;

a comparator configured to compare the error gain signal to an error maximum and an error minimum, where the error gain signal is not adapted if the error gain signal is equal to the error maximum or the error minimum;

an error gain factor selector configured to select an error gain factor from one of the first error gain factor, the second error gain factor, and a value of one based upon a condition of the first or the second counters and further configured to provide an error gain factor signal; and an error gain register configured to provide the error gain signal.

41. An asynchronous digital sample rate estimating apparatus for use with an asynchronous digital rate converter, the asynchronous digital rate converter having an output data rate, the apparatus comprising:

a buffer configured to receive input data at an input data rate;

a write pointer at a first buffer position, the write pointer configured to move to a second buffer position at the input sample rate;

a read pointer at a third buffer position, the read pointer configured to move to a fourth buffer position at a read rate, the read pointer being separated from the write pointer by a phase angle;

a phase detector configured to produce a phase error signal based on the write pointer and the read pointer, the phase error signal indicating the difference between the phase angle and a desired phase angle;

a phase corrector configured to receive the phase error signal and a rate estimate signal to produce a phase correction signal;

a period determinator configured to receive a signal indicating the arrival of an input sample and a clock to provide a measured period;

a reciprocal frequency error generator configured to receive the measured period and a rate estimate, and to provide a reciprocal frequency error signal; and a summing unit configured to receive the reciprocal frequency error signal and the phase correction signal, and configured further to provide a rate estimate correction signal, wherein the rate estimate correction signal is used to generate a new rate estimate.

42. The apparatus of claim 41, further comprising:

an error magnitude generator configured to receive the rate estimate correction signal and produce an error magnitude signal equal to the absolute value of the rate estimate correction signal; and an error gain generator configured to receive the error magnitude signal to adapt an error gain signal and configured further to provide the error gain signal, wherein the error gain generator further includes:

a first counter configured to respond to the number of times the error magnitude signal exceeds a first threshold, the first counter configured further to produce a first error gain factor when the first counter reaches a first counter limit;

a second counter configured to respond to the number of times the error magnitude signal exceeds a second threshold, the second counter configured further to produce a second error gain factor when the second counter reaches a second counter limit;

a comparator configured to compare the error gain signal to an error maximum and an error minimum, where the error gain signal is not adapted if the error gain signal is equal to either the error maximum or the error minimum;

an error gain factor selector configured to select an error gain factor one of from the first error gain factor, the second error gain factor, and a value of one based upon a condition of the first or the second counters and further configured to provide an error gain factor signal;

an error gain register configured to provide the current error gain signal;

an error scaler configured to receive the error gain factor signal and the error gain signal to produce a new error gain signal;

a scaler configured to receive the rate estimation correction signal and the error gain signal and configured further to produce a new rate estimate step size;

a subtracting unit configured to receive the rate estimate step size and the rate estimate signal, and to provide a new rate estimate signal having a new rate estimate signal amplitude; and a rate estimate register, the rate estimate register configured to receive the new rate estimate signal from the summing unit, wherein the rate estimate register is configured to provide the rate estimate signal.

43. An asynchronous sample rate estimating apparatus having an output data rate, the apparatus comprising:

means for receiving a sampled asynchronous signal input;

means for determining a measured sample period by evaluating a plurality of clock cycles between the sampled asynchronous signal input and a previously sampled asynchronous signal input;

means for updating a reciprocal frequency error signal based upon the measured sample period and a rate estimate;

means for generating a phase correction signal for centering a write pointer in a FIFO containing the sampled asynchronous signal input; and means for generating a rate estimate correction signal from the reciprocal frequency error signal and the phase correction signal.

44. A computer-readable medium embodying instructions that, when executed by a computer, cause the computer to:

receive a sampled asynchronous signal input;

determine a measured sample period by evaluating a plurality of clock cycles between the sampled asynchronous signal input and a previously sampled asynchronous signal input;

update a reciprocal frequency error signal based upon the measured sample period and a rate estimate;

generate a phase correction signal for centering a write pointer in a FIFO containing the sampled asynchronous signal input; and generate a rate estimate correction signal from the reciprocal frequency error signal and the phase correction signal.

* * * * *